United States Patent
Hardy et al.

(10) Patent No.: US 12,307,257 B2
(45) Date of Patent: May 20, 2025

(54) DATA PROCESSING SYSTEMS

(71) Applicant: Arm Limited, Cambridge (GB)

(72) Inventors: Edward Hardy, Cambridge (GB); Tord Kvestad Øygard, Kirkenes (NO)

(73) Assignee: Arm Limited, Cambridge (GB)

( * ) Notice: Subject to any disclaimer, the term of this patent is extended or adjusted under 35 U.S.C. 154(b) by 547 days.

(21) Appl. No.: 17/651,999

(22) Filed: Feb. 22, 2022

(65) Prior Publication Data

US 2022/0276872 A1 Sep. 1, 2022

(30) Foreign Application Priority Data

Feb. 26, 2021 (GB) ..................................... 2102761

(51) Int. Cl.
*G06F 3/01* (2006.01)
*G06F 9/38* (2018.01)
*G06F 9/48* (2006.01)

(52) U.S. Cl.
CPC .......... *G06F 9/3889* (2013.01); *G06F 9/4881* (2013.01)

(58) Field of Classification Search
CPC ...... G06F 9/3889; G06F 9/4881; G06F 9/522; G06F 15/78; G06F 9/52; G06F 9/38; G06F 9/3887; G06F 9/3009; G06F 9/30123; G06F 9/3867; G06F 13/1615; G06T 1/20; G06T 1/60
See application file for complete search history.

(56) References Cited

U.S. PATENT DOCUMENTS

| | | | | |
|---|---|---|---|---|
| 10,127,626 | B1* | 11/2018 | Ostby | ........................ G06T 1/20 |
| 10,522,211 | B2* | 12/2019 | Hush | .................... G11C 11/4091 |
| 2011/0078417 | A1 | 3/2011 | Fahs et al. | |
| 2013/0212352 | A1* | 8/2013 | Anderson | ............. G06F 9/3867 |
| | | | | 712/1 |
| 2015/0052537 | A1 | 2/2015 | Gaster | |
| 2020/0081748 | A1 | 3/2020 | Johnson et al. | |
| 2020/0211146 | A1* | 7/2020 | Uhrenholt | ............. G06F 9/3851 |

OTHER PUBLICATIONS

Combined Search and Examination Report dated Dec. 3, 2021, GB Patent Application No. GB2102761.0.

(Continued)

*Primary Examiner* — Kevin L Young
*Assistant Examiner* — Abdou K Seye
(74) *Attorney, Agent, or Firm* — Pearl Cohen Zedek Latzer Baratz LLP

(57) ABSTRACT

A method of operating a data processing system, such as a graphics processing system, is disclosed. A set of plural execution threads performs an iterative data processing operation in which the number of execution threads that perform a respective data processing operation decreases from one iteration to the next. The iterative data processing operation is performed such that at least one execution thread of the set plural execution threads exits the iterative data processing operation when there is at least one iteration of the iterative data processing operation remaining in respect of which the execution thread will not perform a respective data processing operation. A barrier condition may be changed in response to the execution thread exiting the iterative data processing operation.

18 Claims, 8 Drawing Sheets

(56) References Cited

OTHER PUBLICATIONS

IEEE International Symposium on Parallel & Distributed Processing ; [IPDPS 2008], 2008, Anastopoulos N et al, "Facilitating efficient synchronization of asymmetric threads on hyper-threaded processors", pp. 1-8.
Search Report dated Jul. 13, 2022, GB Patent Application No. GB2102761.0.
Gaster et al., "Can GPGPU Programming Be Liberated from the Data-Parallel Bottleneck?", IEEE Computer Society, vol. 45, Nr. 8, pp. 42-52, Aug. 1, 2012.

* cited by examiner

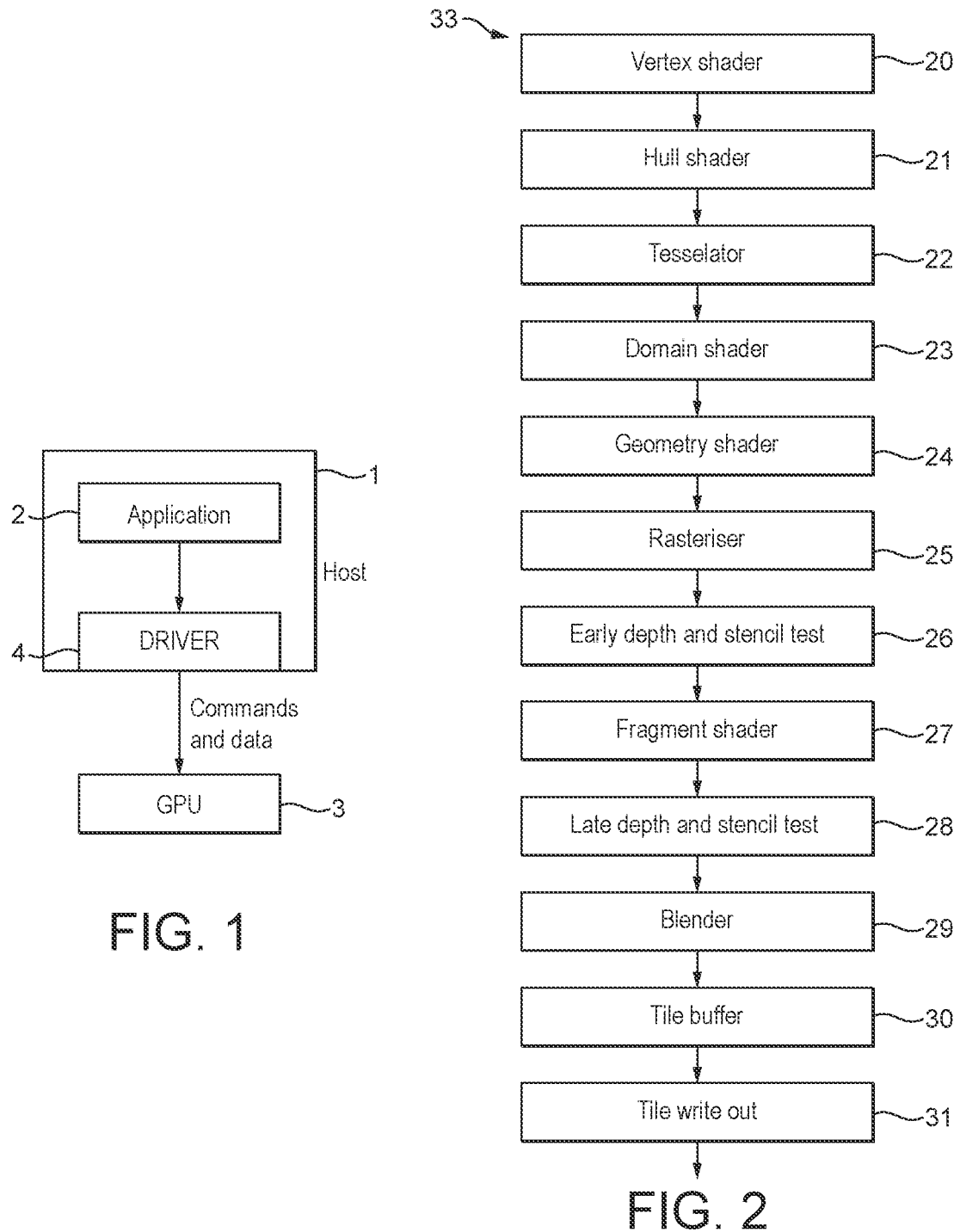

DATA PROCESSING SYSTEMS

CROSS-REFERENCE TO RELATED APPLICATIONS

This application claims priority pursuant to 35 U.S.C. 119(a) to United Kingdom Patent Application No. 2102761.0, filed Feb. 26, 2021, which application is incorporated herein by reference in its entirety.

BACKGROUND

The technology described herein relates to data processing systems and the operation of data processors, and in particular to graphics processing systems and the operation of graphics processors that include one or more programmable execution units.

Many graphics processors (and the graphics pipelines that they implement) now include and/or implement one or more programmable processing stages, commonly referred to as "shaders". For example, a graphics processing pipeline will include one or more of, and typically all of: a geometry shader, a vertex shader, and a fragment (pixel) shader.

These shaders are programmable processing stages that execute shader programs on input data values to generate a desired set of output data, such as appropriately shaded and rendered fragment data in the case of a fragment shader. The "shaders" of the graphics processor and processing pipeline may share programmable processing circuits, or they may each be executed by distinct programmable processing units.

It is also known to use graphics processors and graphics processing pipelines, and in particular shader operation of a graphics processor and graphics processing pipeline, to perform more general computing tasks, e.g. in the case where a similar operation needs to be performed in respect of a large volume of plural different input data values. These operations are commonly referred to as "compute shading" operations, and a number of specific compute shading APIs, such as OpenCL and Vulkan, have been developed for use when it is desired to use a graphics processor and graphics processing pipeline to perform more general computing operations. Compute shading is used for computing arbitrary information. It can be used to process graphics related data, if desired, but is generally used for tasks not directly related to performing graphics processing.

A graphics processing unit (GPU) shader core is thus a processing unit that performs processing by running small programs for each "work item" in an output to be generated. Each "work item" in an output to be generated may be, e.g. a vertex or a fragment (pixel), or a compute shader work item. This generally enables a high degree of parallelism, e.g. in that a typical output, e.g. frame, features a rather large number of vertices and fragments, each of which can be processed independently.

In graphics shader operation, including in compute shading operation, each "work item" will be processed by means of an execution thread which will execute the instructions of the shader program in question for the "work item" in question. There may typically be multiple execution threads each executing at the same time (in parallel), and it may often be desirable for different execution threads to execute instructions in synchronisation with each other. For example, it may typically be desired to synchronise each iteration of a data processing operation that is performed in an iterative manner.

One way of synchronising execution threads is to provide a "barrier" operation. Typically, "work items" (and thus the threads that process those work items) are grouped into "workgroups", and barrier operation is such that when a thread in a workgroup reaches a barrier, the thread must wait until every other thread in the same workgroup has reached the barrier, before the thread can continue beyond the barrier. A barrier can be used, for example, to ensure that all memory access operations to be performed for a workgroup prior to the barrier have been completed before any of the threads in the workgroup continue execution beyond the barrier.

Another way of synchronising execution threads is to group execution threads into "groups" or "bundles" of threads, where the threads of one group are run in hardware in lockstep, e.g. one instruction at a time. In this way, it is possible to share instruction fetch and scheduling resources between all the threads in the thread group. Other terms used for such thread groups include "warps" and "wave fronts". For convenience, the term "thread group" will be used herein, but this is intended to encompass all equivalent terms and arrangements, unless otherwise indicated. The work items processed by the threads of a thread group may typically correspond to a subset of the work items of a workgroup, or a "subgroup".

The Applicants believe that there remains scope for improvements to data processing systems and data processors, and in particular to graphics processing systems and shader program execution in graphics processors.

BRIEF DESCRIPTION OF THE DRAWINGS

Various embodiments of the technology described herein will now be described by way of example only and with reference to the accompanying drawings, in which:

FIG. 1 shows an exemplary graphics processing system including a graphics processor;

FIG. 2 shows schematically a graphics processing pipeline that can be executed by the graphics processor of FIG. 1;

Like reference numerals are used for like components where appropriate in the drawings.

DETAILED DESCRIPTION

Figure 3:
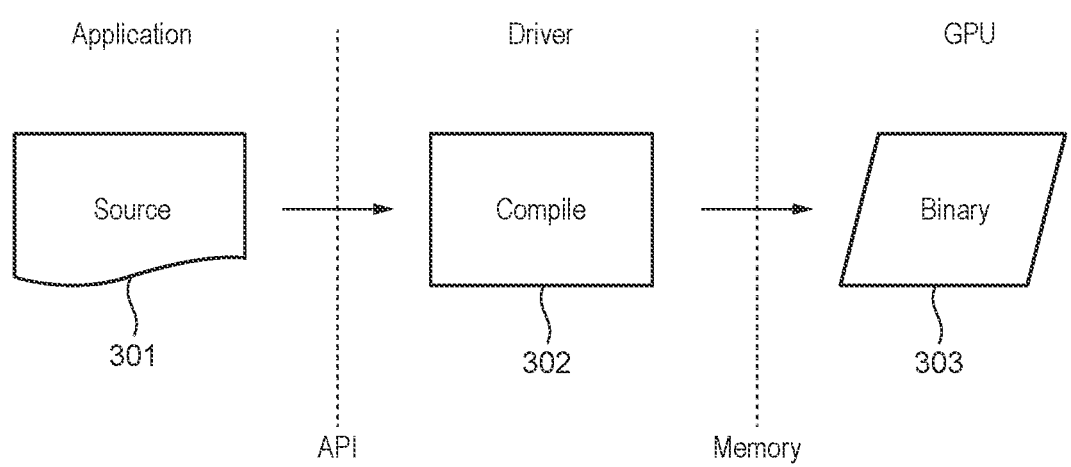
FIG. 3 shows schematically the compiling of a shader program for execution by the graphics processor of FIG. 1.

A first embodiment of the technology described herein comprises a method of operating a data processing system that comprises a data processor that is operable to execute programs to perform data processing operations, and in which a program can be executed by plural execution threads at the same time; the method comprising:

including in a program to be executed by the data processor, a set of one or more instructions which when executed by execution threads of a set of plural execution threads will cause execution threads of the set of plural execution threads to perform an iterative data processing operation in which:
- each iteration of the iterative data processing operation will comprise one or more execution threads of the set of plural execution threads each performing a respective data processing operation; and in which
- the first iteration of the iterative data processing operation will comprise all execution threads of the set of plural execution threads each performing a respective data processing operation;
- each of one or more subsequent iterations of the iterative data processing operation will comprise a subset of one or more of the execution threads that performed a respective data processing operation in the previous iteration each performing a respective data processing operation, and one or more other execution threads of the execution threads that performed a respective data processing operation in the previous iteration not performing a respective data processing operation; and
- each of one or more iterations of the iterative data processing operation will comprise at least one execution thread of the set of plural execution threads exiting the iterative data processing operation when there is at least one iteration of the iterative data processing operation remaining in respect of which the execution thread will not perform a respective data processing operation;

whereby the execution threads of the set of plural execution threads will be caused to perform the iterative data processing operation such that at least one execution thread of the set of plural execution threads that is performing the iterative data processing operation will:
- perform a respective data processing operation in respect of the first iteration of the iterative data processing operation;
- perform a respective data processing operation in respect of each of zero or more subsequent iterations of the iterative data processing operation; and then
- exit the iterative data processing operation when there is at least one iteration of the iterative data processing operation remaining in respect of which the execution thread will not perform a respective data processing operation;

the method further comprising, when a set of plural execution threads is executing the program, in response to the set of instructions:
- execution threads of the set of plural execution threads performing the iterative data processing operation; and
- at least one execution thread of the set of plural execution threads that is performing the iterative data processing operation:
  - performing a respective data processing operation in respect of the first iteration of the iterative data processing operation;
  - performing a respective data processing operation in respect of each of zero or more subsequent iterations of the iterative data processing operation; and then
  - exiting the iterative data processing operation when there is at least one iteration of the iterative data processing operation remaining in respect of which the execution thread will not perform a respective data processing operation.

A second embodiment of the technology described herein comprises a data processing system comprising:
- a data processor that is operable to execute programs to perform data processing operations, and in which a program can be executed by plural execution threads at the same time; and
- a processing circuit configured to include in a program to be executed by the data processor, a set of one or more instructions which when executed by execution threads of a set of plural execution threads will cause execution threads of the set of plural execution threads to perform an iterative data processing operation in which:
  - each iteration of the iterative data processing operation will comprise one or more execution threads of the set of plural execution threads each performing a respective data processing operation; and in which
  - the first iteration of the iterative data processing operation will comprise all execution threads of the set of plural execution threads each performing a respective data processing operation;
  - each of one or more subsequent iterations of the iterative data processing operation will comprise a subset of one or more of the execution threads that performed a respective data processing operation in the previous iteration each performing a respective data processing operation, and one or more other execution threads of the execution threads that performed a respective data processing operation in the previous iteration not performing a respective data processing operation; and
  - each of one or more iterations of the iterative data processing operation will comprise at least one execution thread of the set of plural execution threads exiting the iterative data processing operation when there is at least one iteration of the iterative data processing operation remaining in respect of which the execution thread will not perform a respective data processing operation;

whereby the execution threads of the set of plural execution threads will be caused to perform the iterative data processing operation such that at least one execution thread of the set of plural execution threads that is performing the iterative data processing operation will:
- perform a respective data processing operation in respect of the first iteration of the iterative data processing operation;
- perform a respective data processing operation in respect of each of zero or more subsequent iterations of the iterative data processing operation; and then
- exit the iterative data processing operation when there is at least one iteration of the iterative data processing operation remaining in respect of which the execution thread will not perform a respective data processing operation;

wherein the data processor is configured such that, when a set of plural execution threads is executing the program, in response to the set of instructions:
- execution threads of the set of plural execution threads will perform the iterative data processing operation; and
- at least one execution thread of the set of plural execution threads that is performing the iterative data processing operation will:
  - perform a respective data processing operation in respect of the first iteration of the iterative data processing operation;

perform a respective data processing operation in respect of each of zero or more subsequent iterations of the iterative data processing operation; and then exit the iterative data processing operation when there is at least one iteration of the iterative data processing operation remaining in respect of which the execution thread will not perform a respective data processing operation.

The technology described herein also extends to the operation of a data processor in response to a set of one or more instructions in accordance with the technology described herein.

Thus, a third embodiment of the technology described herein comprises a method of operating a data processor that comprises a programmable execution unit that is operable to execute programs to perform data processing operations, and in which a program can be executed by plural execution threads at the same time; the method comprising:

when a set of plural execution threads is executing a program that includes a set of one or more instructions for performing an iterative data processing operation in which:

each iteration of the iterative data processing operation will comprise one or more execution threads of the set of plural execution threads each performing a respective data processing operation; and in which the first iteration of the iterative data processing operation will comprise all execution threads of the set of plural execution threads each performing a respective data processing operation;

each of one or more subsequent iterations of the iterative data processing operation will comprise a subset of one or more of the execution threads that performed a respective data processing operation in the previous iteration each performing a respective data processing operation, and one or more other execution threads of the execution threads that performed a respective data processing operation in the previous iteration not performing a respective data processing operation; and each of one or more iterations of the iterative data processing operation will comprise at least one execution thread of the set of plural execution threads exiting the iterative data processing operation when there is at least one iteration of the iterative data processing operation remaining in respect of which the execution thread will not perform a respective data processing operation; in response to the set of instructions:

execution threads of the set of plural execution threads performing the iterative data processing; and at least one execution thread of the set of plural execution threads that is performing the iterative data processing operation:

performing a respective data processing operation in respect of the first iteration of the iterative data processing operation;

performing a respective data processing operation in respect of each of zero or more subsequent iterations of the iterative data processing operation; and then exiting the iterative data processing operation when there is at least one iteration of the iterative data processing operation remaining in respect of which the execution thread will not perform a respective data processing operation.

A fourth embodiment of the technology described herein comprises a data processor comprising:

a programmable execution unit that is operable to execute programs to perform data processing operations, and in which a program can be executed by plural execution threads at the same time; and a processing circuit configured such that, when a set of plural execution threads is executing a program that includes a set of one or more instructions for performing an iterative data processing operation in which:

each iteration of the iterative data processing operation will comprise one or more execution threads of the set of plural execution threads each performing a respective data processing operation; and in which the first iteration of the iterative data processing operation will comprise all execution threads of the set of plural execution threads each performing a respective data processing operation;

each of one or more subsequent iterations of the iterative data processing operation will comprise a subset of one or more of the execution threads that performed a respective data processing operation in the previous iteration each performing a respective data processing operation, and one or more other execution threads of the execution threads that performed a respective data processing operation in the previous iteration not performing a respective data processing operation; and each of one or more iterations of the iterative data processing operation will comprise at least one execution thread of the set of plural execution threads exiting the iterative data processing operation when there is at least one iteration of the iterative data processing operation remaining in respect of which the execution thread will not perform a respective data processing operation; in response to the set of instructions:

execution threads of the set of plural execution threads will perform the iterative data processing operation; and at least one execution thread of the set of plural execution threads that is performing the iterative data processing operation will:

perform a respective data processing operation in respect of the first iteration of the iterative data processing operation;

perform a respective data processing operation in respect of each of zero or more subsequent iterations of the iterative data processing operation; and then exit the iterative data processing operation when there is at least one iteration of the iterative data processing operation remaining in respect of which the execution thread will not perform a respective data processing operation.

The technology described herein is concerned with performing iterative data processing operations in a data processor (and system) that can execute plural execution threads at the same time (in parallel). In the technology described herein, when performing an iterative data processing operation, the first iteration (cycle) of the overall iterative data processing operation involves all execution threads of a set of plural execution threads each performing a respective data processing operation, but one or more subsequent iterations (cycles) of the iterative data processing operation each involve fewer execution threads performing a respective data processing operation than the previous iteration, i.e. such that the number of execution threads performing a respective data processing operation decreases from one iteration (cycle) of the iterative data processing operation to the next.

In other words, in the technology described herein, when performing an iterative data processing operation, there is at least one execution thread that performs a respective data processing operation in respect of each iteration of the overall iterative data processing operation, and there is at least one other execution thread that performs a respective data processing operation in respect of each of a first one or more iterations of the overall iterative data processing operation, but then does not perform a respective data processing operation in respect of each of a remaining one or more iterations of the overall iterative data processing operation.

An example of such an iterative data processing operation would be (and in an embodiment is) a so-called "reduction" operation that operates to combine plural input data values into a single output data value. A "reduction" operation may typically be performed iteratively, with each iteration comprising a decreasing number of execution threads performing a respective combining operation. Any binary operation that is commutative and associative can be used as a reduction operator. Thus, the combining operation of a reduction operation may be (and in an embodiment is) a sum operation to sum data values, or a multiplication operation to multiply data values. Other operators, such as maximum and minimum, are also possible.

In the technology described herein, one or more of the iterations of the iterative data processing (e.g. reduction) operation (such as, and in an embodiment, the first iteration or a subsequent iteration other than the last iteration) each involve an execution thread exiting the iterative data processing operation (and, as will be discussed in more detail below, in an embodiment retiring) when there is at least one iteration of the iterative data processing operation remaining in respect of which the execution thread will not perform a respective data processing operation. In other words, an execution thread of the set of plural execution threads exits the iterative data processing operation when there is at least one iteration of the iterative data processing operation remaining in respect of which one or more other execution threads of the set of plural execution threads will perform a respective data processing operation. In other words, an execution thread of the set of plural execution threads exits the iterative data processing operation when there is at least one iteration of the iterative data processing operation remaining in respect of which the execution thread will not perform a respective data processing operation and one or more other execution threads of the set of plural execution threads will perform a respective data processing operation.

Thus, once an execution thread has completed a respective data processing (e.g. combining) operation in respect of each of one or more iterations in which the execution thread does perform a respective data processing (e.g. combining) operation, and before the execution threads begins a subsequent iteration in respect of which it will not perform a respective data processing (e.g. combining) operation, the execution thread exits the iterative data processing operation (e.g. retires). Thus, in the technology described herein, at least one execution thread of the set of execution threads that began the iterative data processing operation exits the iterative data processing operation (and optionally retires) "early", i.e. before the last one or more iterations of the iterative data processing operation begin.

The Applicants have recognised that when performing an iterative data processing operation such as a "reduction" operation, there will be some execution threads that only need to perform a respective data processing (e.g. combining) operation in respect of some but not all iterations of the iterative data processing operation, and moreover, the number of execution threads that are not actually performing the data processing operation may increase from one iteration to the next. The Applicants have furthermore recognised that it is possible to e.g. retire such execution threads from the iterative data processing operation "early" (before the last one or more iterations of the iterative data processing operation have begun) without affecting the final result of the iterative data processing operation.

Moreover, by e.g. retiring such execution threads from the iterative data processing operation "early" in this manner, overall energy consumption associated with performing the iterative data processing operation can be reduced, e.g. as compared with all execution threads participating in all iterations of the iterative data processing operation, regardless of whether or not an execution thread actually performs a respective data processing operation in respect of those iterations.

Thus, the technology described herein can allow iterative data processing operations such as reduction operations, to be performed in a particularly efficient manner, such that the energy consumption of a data processor when performing such an operation can be reduced.

It will be appreciated, therefore, that the technology described herein provides an improved data processing system and data processor.

The technology described herein can be used by and on any suitable data processor in which a program can be executed by plural execution threads at the same time, such as a (multi-threaded) central processing unit (CPU).

In an embodiment, as discussed above, the technology described herein is used for a graphics processor (GPU) executing a shader program, and so in an embodiment, the data processing system is a graphics processing system, the data processor is a graphics processor (GPU), and the program is a (graphics) shader program.

In this case, the program may be, e.g., a fragment (pixel) shader program, a vertex shader program or a tile shader program. However, in an embodiment, the program to be executed by the graphics processor (GPU) is a compute shader program, i.e. a program for performing more general "compute" processing (rather than graphics processing per se), such as in accordance with the OpenCL or Vulkan APIs, or other forms of kernel execution.

To facilitate program execution, in an embodiment, the data (e.g. graphics) processor comprises one or more programmable execution units (e.g. shader cores), that are each operable to execute (e.g. shader) programs, and in an embodiment to execute plural execution threads at the same time (in parallel). Thus, in an embodiment, the execution threads of the set of plural execution threads are issued to the one or more programmable execution units (shaders) of the data processor for execution. In an embodiment, the data (e.g. graphics) processor comprises a thread spawning circuit that spawns execution threads, and issues them to the one or more programmable execution units (shaders) of the data (e.g. graphics) processor for execution.

The data (e.g. graphics) processor (programmable execution unit (shader)) should be, and in an embodiment is, operable to execute instructions in a (the) (shader) program for each processing item that the data (e.g. graphics) processor (programmable execution unit (shader)) receives for processing. Thus, in an embodiment, the thread spawning circuit spawns and issues an execution thread for each item to be processed. In an embodiment, each execution thread of the set of plural execution threads executes the program for a respective processing item of a set of plural processing items to be processed for generating an output.

A processing item that the program is executed for can be any suitable and desired processing item. In the case of graphics processing, a processing item may be, for example, a vertex, primitive or a fragment (pixel). In the case of OpenCL "compute" processing, for example, each processing item is in an embodiment a respective (OpenCL) work item. Similarly, a set of plural processing items can be any suitable and desired set of plural processing items. A set of plural processing items is in an embodiment a respective (OpenCL) workgroup. Each processing item (work item) is in an embodiment associated with a respective set of one or more initial data values to be processed.

Thus, in an embodiment, the set of plural execution threads corresponds to a respective set of plural processing items (workgroup), and each execution thread of the set of plural execution threads corresponds to a respective processing item (work item) of that set of plural processing items (workgroup). Where there are plural sets of plural processing items (workgroups) (and corresponding sets of plural execution threads), one or more, or all, of the plural sets of plural processing items (workgroups) (sets of plural execution threads) may each be processed in the manner of the technology described herein.

In an embodiment, the data (e.g. graphics) processor (programmable execution unit) is operable to group execution threads executing a program into "groups" or "bundles" of threads, with the threads of one group executing the program together and in lockstep. This arrangement can improve program (shader) execution efficiency, since it is possible to, e.g., share instruction fetch and scheduling resources between all the threads in the group. (Other terms used for such thread groups include "subgroups", "warps" and "wavefronts". For convenience the term thread group will be used herein, but this is intended to encompass all equivalent terms and arrangements, unless otherwise indicated.)

In this case, in an embodiment, each thread group corresponds to a respective subset of (some but not all of) a set of plural processing items (workgroup), and each execution thread of a thread group corresponds to a respective processing item (work item) of that subset. In the case of OpenCL, for example, each thread group in an embodiment corresponds to a (OpenCL) subgroup, and each execution thread of a thread group in an embodiment corresponds to a respective work item of that subgroup. In an embodiment, a set of plural processing items (workgroup) comprises plural such subsets (subgroups), and thus the set of plural execution threads in an embodiment corresponds to plural thread groups. Thus, in an embodiment, thread groups are issued to the one or more programmable execution units of the data (e.g. graphics) processor for execution. In an embodiment, the data processor comprises a thread group generator and scheduler that generates and schedules thread groups for execution. In an embodiment, where execution threads are grouped into thread groups, the at least one execution thread of the set of plural execution threads that exits the iterative data processing operation (and in an embodiment retires) "early" is a thread group of execution threads.

The thread groups that execution threads may be grouped into can be any suitable and desired size. In an embodiment, there is a fixed thread group size that the data processor supports. The thread groups may contain, e.g. 4, 8, 16 or 32 threads (i.e. there is a "warp width" of 4, 8, 16 or 32). Wider thread groups (warps) would be possible, if desired.

To facilitate parallel execution, in an embodiment the data processor (programmable execution unit) is configured as a plurality of execution lanes, with each execution lane being operable to perform processing operations for an execution thread. The number of execution lanes (and thus the number of execution threads that can be processed in parallel) is in an embodiment equal to the number of threads in a thread group. However, other arrangements are possible.

Thus, in an embodiment, the execution threads of the set of plural execution threads are issued to the execution lanes for execution, in an embodiment in a manner appropriate for the data processor in question. The execution lanes will then in an embodiment operate to execute the program (including the set of one or more instructions for performing the iterative data processing operation) for the execution threads, e.g., and in an embodiment, in the normal manner for the data processor.

An execution lane is in an embodiment provided by one or more functional units operable to perform data processing operations for an instruction being executed by an execution thread. Each functional unit is in an embodiment able to process as many threads in parallel as there are execution lanes (so each functional unit will comprise a set of plural execution lanes).

The functional unit or units can comprise any desired and suitable functional unit or units operable to perform data processing operations in response to and in accordance with program instructions. Thus the functional unit or units in an embodiment comprise one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load-type units (such as varying, texturing or load units in the case of a graphics processor), store-type units (such as blend or store units), etc. In an embodiment, the functional units (at least) comprise arithmetic units (i.e. units operable to perform arithmetic (mathematical) operations). Each execution lane of the data processor (programmable execution unit) may (also) have associated with it (and available to it), a set of one or more, and in an embodiment a set of plural, registers for storing data values associated with and for the execution lane (i.e. for storing data values being processed for the execution thread that the execution lane is currently executing).

The data processor (programmable execution unit) in an embodiment also comprises appropriate control circuit(s) (control logic) for controlling the execution lanes (the functional units operating as the execution lanes) to cause them to perform the desired and appropriate processing operations. This can comprise any suitable and desired control circuit(s), such as appropriate thread issuing circuit(s) and/or instruction decode circuit(s), etc.

In an embodiment, the data (e.g. graphics) processing system includes a host processor that is operable to issue data processing commands and data to the data (e.g. graphics) processor. The host processor can be any suitable and desired processor, such as and in an embodiment a central processing unit (CPU), of the data (e.g. graphics) processing system.

In an embodiment, the host processor of the data (e.g. graphics) processing system is operable to generate data (e.g. graphics) processing commands and data for the data (e.g. graphics) processor in response to instructions from an application executing on the host processor. This is in an embodiment done by a driver for the data (e.g. graphics) processor that is executing on the host processor.

The program that the set of one or more instructions is included in can be any suitable and desired (shader) program that the (programmable execution unit of the) data (e.g. graphics) processor can execute.

It will be appreciated that, as well as including the set of one or more instructions for performing the iterative data processing operation in the manner of the technology described herein, the program can, and in an embodiment does, otherwise include any suitable and desired other instructions that may be executed by the data (e.g. graphics) processor. The (shader) program may contain only a single set of one or more instructions for performing a single instance of the iterative data processing operation, or there may be plural such sets of instructions included in the program.

The set (or sets) of one or more instructions can be included in a (the) (shader) program in any suitable and desired manner and by any suitable and desired component and element of the data processing system.

In an embodiment, a (shader) program will initially be provided using a high level (shader) programming language, such as GLSL, HLSL, OpenCL, C, etc., e.g. by an application executing on the host processor that requires data processing operations.

The high level (shader) program will then in an embodiment be translated by a (shader language) compiler to a binary code (shader) program including instructions for execution by the data (e.g. graphics) processor. The compilation process for converting the e.g. shader language expressions to binary code instructions may take place via a number of intermediate representations of the program within the compiler. Thus the program written in the high level shader language may be translated into a compiler specific intermediate representation (and there may be several successive intermediate representations within the compiler), with the final intermediate representation being translated into the binary code instructions for the target data (e.g. graphics) processor.

In these arrangements, the compiler (processing circuit) in an embodiment is part of and executes on the host processor of the data processing system, and in an embodiment is part of a driver for the data (e.g. graphics) processor that is executing on the host processor. In this case, the compiler and compiled code would run on separate processors within the overall data processing system. However, other arrangements would be possible, such as the compiler running on the same processor as the compiled code, or the compiler being run on a (completely) separate processor such as the program being pre-compiled on a separate system and being distributed in a compiled form.

Thus, the set of one or more instructions may be included in the (compiled) program by a compiler compiling the program from a high level version of the program (application program code). Correspondingly, the processing circuit that includes the set of instructions in the program is in an embodiment a compiler for the (programmable execution unit of the) data (e.g. graphics) processor.

It will be appreciated that the technology described herein also extends to the operation of a compiler including in a program that the compiler is compiling, a set of one or more instructions in accordance with the technology described herein.

Thus, a fifth embodiment of the technology described herein comprises a method of compiling a program to be executed by a data processor, the method comprising:
including in the program, a set of one or more instructions which when executed by execution threads of a set of plural execution threads will cause execution threads of the set of plural execution threads to perform an iterative data processing operation in which:
 each iteration of the iterative data processing operation will comprise one or more execution threads of the set of plural execution threads each performing a respective data processing operation; and in which
 the first iteration of the iterative data processing operation will comprise all execution threads of the set of plural execution threads each performing a respective data processing operation;
 each of one or more subsequent iterations of the iterative data processing operation will comprise a subset of one or more of the execution threads that performed a respective data processing operation in the previous iteration each performing a respective data processing operation, and one or more other execution threads of the execution threads that performed a respective data processing operation in the previous iteration not performing a respective data processing operation; and
 each of one or more iterations of the iterative data processing operation will comprise at least one execution thread of the set of plural execution threads exiting the iterative data processing operation when there is at least one iteration of the iterative data processing operation remaining in respect of which the execution thread will not perform a respective data processing operation;
whereby the execution threads of the set of plural execution threads will be caused to perform the iterative data processing operation such that at least one execution thread of the set of plural execution threads that is performing the iterative data processing operation will:
 perform a respective data processing operation in respect of the first iteration of the iterative data processing operation;
 perform a respective data processing operation in respect of each of zero or more subsequent iterations of the iterative data processing operation; and then
 exit the iterative data processing operation when there is at least one iteration of the iterative data processing operation remaining in respect of which the execution thread will not perform a respective data processing operation.

A sixth embodiment of the technology described herein comprises a compiler for compiling a program to be executed by a data processor, the compiler comprising:
 a processing circuit configured to include in a program to be executed by the data processor, a set of one or more instructions which when executed by execution threads of a set of plural execution threads will cause execution threads of the set of plural execution threads to perform an iterative data processing operation in which:
 each iteration of the iterative data processing operation will comprise one or more execution threads of the set of plural execution threads each performing a respective data processing operation; and in which
 the first iteration of the iterative data processing operation will comprise all execution threads of the set of plural execution threads each performing a respective data processing operation;
 each of one or more subsequent iterations of the iterative data processing operation will comprise a subset of one or more of the execution threads that performed a respective data processing operation in the previous iteration each performing a respective data processing operation, and one or more other execution threads of the execution threads that performed a respective data processing operation in the previous iteration not performing a respective data processing operation; and each of one or more iterations of the iterative data processing operation will comprise at least one execution thread of the set of plural execution threads exiting the iterative data processing operation when there is at least one iteration of the iterative data processing operation remaining in respect of which the execution thread will not perform a respective data processing operation;

whereby the execution threads of the set of plural execution threads will be caused to perform the iterative data processing operation such that at least one execution thread of the set of plural execution threads that is performing the iterative data processing operation will:

perform a respective data processing operation in respect of the first iteration of the iterative data processing operation;

perform a respective data processing operation in respect of each of zero or more subsequent iterations of the iterative data processing operation; and then exit the iterative data processing operation when there is at least one iteration of the iterative data processing operation remaining in respect of which the execution thread will not perform a respective data processing operation.

As will be appreciated by those skilled in the art, these embodiments of the technology described herein can and in an embodiment do include one or more, and in an embodiment all, of the features of the technology described herein, as appropriate.

In an embodiment, the set of one or more instructions is included in the (compiled) program (by the compiler (processing circuit)) in response to a sequence of one or more instructions in the initially provided (high level) application program code. In an embodiment, the compiler (processing circuit) is configured to recognise a particular sequence of one or more instructions in the (high level) application program code, and to include the set of one or more instructions in the (compiled) program in response to recognising that sequence of instructions.

The instructions that are included in the program should, and in an embodiment do include instruction(s) for causing execution threads to perform the iterative data processing operation, and instruction(s) for causing at least one of those execution threads to exit the iterative data processing operation (and in an embodiment to retire) "early" in the manner of the technology described herein.

In an embodiment, the instruction(s) included in the program for causing execution threads to perform the iterative data processing operation cause execution threads to perform the iterative data processing operation by way of a loop, with each iteration of the loop corresponding to an iteration of the iterative data processing operation. In this case, the instruction(s) included in the program for causing an execution thread to exit the iterative data processing operation "early" in an embodiment cause the execution thread to exit (e.g. "break") the loop before the last iteration. An execution thread may exit the loop, for example, by retiring, or by "breaking" the loop but remaining active thereafter, e.g. such that the execution thread can then continue beyond the loop to, e.g. perform some other processing. Thus, the at least one execution thread may exit the iterative data processing operation such that it remains active to perform some other processing, or exit the iterative data processing operation such that it retires.

Thus, in an embodiment, (the) at least one execution thread exits the iterative data processing operation and performs other processing when there is at least one iteration of the iterative data processing operation remaining in respect of which the execution thread will not perform a respective data processing operation. In an embodiment, (the) at least one execution thread retires when there is at least one iteration of the iterative data processing operation remaining in respect of which the execution thread will not perform a respective data processing operation.

A programmer may include an appropriate sequence of instruction(s) in the (high level) application program code, with the compiler (processing circuit) then including the set of one or more instructions for performing the iterative data processing operation and triggering the "early" exit (e.g. retirement) of threads in the manner of the technology described herein in the (complied) program in response thereto.

In an embodiment, a specific instruction is visible to the application program interface (API) for causing threads to exit or retire "early" in the manner of the technology described herein, such that a programmer may explicitly include that "exit early" or "retire early" instruction in the (high level) application program code, with the compiler then including a corresponding instruction or instructions in the (set of one or more instructions in the) (compiled) program in response thereto to trigger the "early" exit or retirement of execution threads in the manner of the technology described herein.

Thus, in an embodiment, a (and in an embodiment each) execution thread that exits (e.g. retires) "early" in the manner of the technology described herein in an embodiment does so (in response to an instruction (or instructions) that is included in the program) in response to an instruction that is visible to an application program interface (API) for the program.

In an embodiment, the compiler (processing circuit) is operable to automatically (of its own volition) include one or more instructions in the (set of one or more instructions in the) (compiled) program to trigger execution threads to exit (e.g. retire) "early" in the manner of the technology described herein, i.e. without an instruction having been included explicitly, e.g. by a programmer, in the application program code.

Thus, in an embodiment the compiler (processing circuit) for the program automatically inserts an instruction (or instructions) in the (set of one or more instructions in the) (compiled) program to trigger the "early" exit (e.g. retirement) of threads in the manner of the technology described herein.

The compiler may automatically include an instruction(s) to trigger the "early" exit or retirement of threads in the manner of the technology described herein in the (compiled) program in any suitable and desired way. For example, the compiler may be configured to identify opportunities to insert "exit early" or "retire early" instruction(s) in the program when compiling the application program code, e.g. by analysing the application program code to identify one or more particular steps in the program code that can be performed in the manner of the technology described herein.

In an embodiment, the e.g. compiler is operable to determine (based on the application program code) whether the program (operation) is such that one or more execution threads can exit or retire ("early") without affecting an output of the iterative data processing operation and/or program, and to, if so, and in an embodiment, determine (based on the application program code) a set of one or more conditions which will be satisfied by an execution thread that is executing the program when that execution thread can exit or retire ("early") without affecting an output of the iterative data processing operation and/or program (and which will not be satisfied when the execution thread exiting or retiring would affect an output of the iterative data processing operation and/or program), and to include instruction(s) in the program to cause an execution thread that is executing the program to exit or retire ("early") when it satisfies the set of one or more "early exit" or "early retirement" conditions.

The determined set of one or more "early exit" or "early retirement" conditions may, for example, be satisfied by an execution thread when the execution thread will not contribute further to an output of the iterative data processing operation and/or program (and not satisfied when the execution thread will contribute further to an output of the iterative data processing operation and/or program).

The compiler may, for example and in an embodiment, be configured to recognise that an execution thread can exit the iterative data processing operation (e.g. retire) ("early") without affecting an output of the iterative data processing operation when the execution thread will perform no further data processing operations in respect of the iterative data processing operation. The compiler may, for example and in an embodiment, be configured to recognise that an execution thread can retire ("early") without affecting an output of the program when the execution thread will perform no further data processing operations in respect of the iterative data processing operation and/or other processing operations that may affect an output of the program, such as memory access operations and/or cross-thread operations. Thus, in an embodiment, the set of one or more "early exit" or "early retirement" conditions are based on whether or not an execution thread will perform a respective data processing operation in respect of one or more remaining iterations of the iterative data processing operation, and/or whether or not the execution thread will perform any other operations that may affect an output of the program, such as memory access operations and/or cross-thread operations.

In an embodiment, as will be discussed in more detail below, the program includes one or more barrier instructions for causing execution threads to perform iterations of the iterative data processing operation (e.g. loop) in synchronisation with each other. In this case, the compiler is in an embodiment operable to recognise when an execution thread can omit executing one or more of the barrier instructions without affecting an output of the iterative data processing operation and/or program, and to include instruction(s) in the program to cause an execution thread that is executing the program to exit the iterative data processing operation (e.g. retire) ("early") before executing those "omittable" one or more barrier instructions.

In an embodiment, the compiler can recognise that an execution thread should only exit the iterative data processing operation to perform other processing "early" if that other processing need not be synchronised with other execution threads, e.g. if that other processing does not comprise a barrier operation.

An instruction (or instructions) included in the (compiled) program may cause an execution thread to exit (e.g. retire) "early" in any suitable and desired manner. In an embodiment, the instruction(s) cause an execution thread to exit the iterative data processing operation ("early") by causing the execution thread to jump past the remaining instructions associated with the iterative data processing operation, e.g. without participating in any further iterations of the iterative data processing operation and/or executing any further barrier instructions, e.g. past the last barrier instruction for the iterative data processing operation (loop).

In embodiments in which the instruction(s) cause an execution thread to exit ("early") and perform other processing, the instruction(s) in an embodiment cause an execution thread to jump to the beginning of a set of one or more instructions for performing that other processing.

In embodiments in which the instruction(s) cause an execution thread to retire "early", the instruction(s) in an embodiment cause an execution thread to jump to the end of the program, e.g. without participating in any further iterations of the iterative data processing operation and/or executing any further barrier instructions, such that it then retires. Alternatively, the instruction(s) may include a "discard" instruction to trigger an execution thread to terminate (directly).

In an embodiment, execution threads are caused to conditionally execute the (e.g. "discard" or "jump") instruction(s) to trigger "early exit" or "early retirement", with the condition in an embodiment being based on an identifier associated with a thread (thread ID) or execution lane (execution lane ID), or a variable such as an atomic counter. For example and in an embodiment, a conditional branch is in an embodiment included in the program, such that an execution thread or threads that is associated with a particular identifier or set of plural identifiers follows the conditional branch and consequently exits the iterative data processing operation (e.g. retires) ("early").

In an embodiment, an execution thread is caused to execute the (e.g. "discard" or "jump") instruction(s) to trigger "early exit" or "early retirement" when it satisfies the set of one or more "early exit" or "early retirement" conditions (determined by the compiler). In an embodiment, where there are plural different "early exit" or "early retirement" conditions which will each be satisfied by an execution thread when the execution thread can exit the iterative data processing operation or retire "early", each such "early exit" or "early retirement" condition is "ANDed" together to determine an overall "early exit" or "early retirement" condition which will be satisfied when an execution thread can exit or retire "early".

Thus, in an embodiment, one or more instructions are included in the program that will cause an execution thread that is executing the program to exit the iterative data processing operation (e.g. retire) ("early") when processing that the execution thread would otherwise perform (were the execution thread to continue participating in the iterative data processing operation and/or executing the program) will not affect an output of the iterative data processing operation and/or program. In an embodiment, an execution thread that is executing the program exits the iterative data processing operation (e.g. retires) in response to the one or more instructions when processing that the execution thread would otherwise perform (were the execution thread to continue participating in the iterative data processing operation and/or executing the program) will not affect an output of the iterative data processing operation and/or program.

In an embodiment, the one or more instructions included in the program cause an execution thread that is executing the program to exit the iterative data processing operation (e.g. retire) ("early") before executing one or more ("omittable") barrier instructions that the execution thread would otherwise execute were the execution thread to continue participating in the iterative data processing operation and/or executing the program.

Once the set of one or more instructions has been included in the program, those instructions will be executed by the data processor (programmable execution unit) by means of plural execution threads, which execution threads will, in response to the instructions, operate together to perform an iterative data processing operation in the manner of the technology described herein.

In particular, in the technology described herein, a set of plural execution threads perform an iterative data processing operation which comprises plural iterations, including a first iteration and then one or more subsequent iterations including a last iteration. In an embodiment, the first iteration of the iterative data processing operation comprises execution threads processing initial data values for the iterative data processing operation to generate intermediate data values, and the last iteration of the iterative data processing operation in an embodiment comprises one or more execution threads processing intermediate data values to generate an overall output of the iterative data processing operation. Each subsequent iteration of the iterative data processing operation other than the last iteration in an embodiment comprises one or more execution threads processing intermediate data values to generate intermediate data values.

The first iteration of the iterative data processing operation comprises all of the execution threads of the set of plural execution threads each performing a respective data processing operation (to e.g. process a respective set of one or more initial data values). Each of one or more subsequent iterations of the iterative data processing operation comprises (only) a subset of one or more of (i.e. only some but not all of) the execution threads that performed a respective data processing operation in the (immediately) previous iteration each performing a respective data processing operation (to e.g. process a respective set of one or more intermediate data values).

Thus, the number of execution threads that perform a respective data processing operation decreases from one iteration of the iterative data processing operation to the next, and the number of execution threads that perform a respective data processing operation in respect of the last iteration of the iterative data processing operation is less than the number of execution threads in the set of execution threads (that performed a respective data processing operation in respect of the first iteration of the iterative data processing operation).

The number of execution threads performing a respective data processing operation could decrease from one iteration to the next, and stay the same from another, different iteration to the next. However, in an embodiment, the number of execution threads performing a respective data processing operation decreases from each iteration of the iterative data processing operation to the next. That is, each subsequent iteration of the iterative data processing operation in an embodiment comprises fewer execution threads of the set of plural execution threads performing a respective data processing operation than the (immediately) previous iteration. However, it will be appreciated that there may be subsequent iterations of the iterative data processing operation in which the same one or more of the execution threads that performed a respective data processing operation in the previous iteration each perform a respective data processing operation.

The number of execution threads performing a respective data processing operation can decrease from one iteration to the next by any suitable number of execution threads. The number of execution threads could decrease from one iteration of the iterative data processing operation to the next by a certain number of execution threads, such as one, two or four execution threads. In an embodiment, the number of execution threads decreases from one iteration of the iterative data processing operation to the next by a certain fraction of execution threads, such as by a quarter or a half.

In an embodiment, each subsequent iteration of the iterative data processing operations comprises (only) half of the execution threads that performed a respective data processing operation in the (immediately) previous iteration performing a respective data processing operation (and the other half not performing a respective data processing operation).

In these embodiments, a (the) set of plural execution threads (that starts the iterative data processing operation) in an embodiment comprises a power of two number of execution threads (such as 64, 128 or 256 execution threads), such that each iteration comprises a (in an embodiment progressively smaller) power of two number of execution threads performing a respective data processing operation. Correspondingly, a set of plural processing items (workgroup) that is being processed in an embodiment comprises a power of two number of processing items (work items), such as 64, 128 or 256 processing items (work items). However, other numbers of execution threads and processing items are possible.

The iterative data processing operation can be any suitable processing operation that can be performed as multiple iterations, with the number of execution threads performing a respective data processing operation decreasing from one iteration to the next. The iterative data processing operation may be, for example and in an embodiment, a pre-fix sum operation (e.g. and in an embodiment, when generating a graphics mipmap).

In an embodiment, as mentioned above, the iterative data processing operation is a reduction operation. In this case, the overall iterative data processing operation will in an embodiment be to combine a set of initial data values (for a set of plural processing items (workgroup)) to produce a single combined overall output data value (for the set of plural processing items (workgroup)), and will in an embodiment be performed by means of plural iterations, in which each iteration in an embodiment involves one or more execution threads each performing a respective combining operation.

A reduction operation may comprise, for example and in an embodiment, an additive (sum) reduction operation (i.e. an operation to add the (initial) data values of all the threads in a set of threads (for a set of plural processing items (workgroup)) to each other), or a multiplicative (product) reduction operation (i.e. to multiply the (initial) data values for all the threads in a set of threads (for a set of plural processing items (workgroup)) together). It could also comprise a maximum operation (i.e. an operation to determine the maximum of the (initial) data values of all the threads in a set of threads (for a set of plural processing items (workgroup))), or a minimum operation (i.e. an operation to determine the minimum of the (initial) data values of all the threads in a set of threads (for a set of plural processing items (workgroup))). It could also be a bitwise operation such as AND, OR or XOR, or any other commutative and associative binary operation.

The data processing operations that are performed by execution threads in respect of iterations of the iterative data processing operation should correspond to the overall iterative data processing operation in question. The data processing operations are in an embodiment all the same type of data processing operation, but each data processing operation is in an embodiment performed for its own, respective, set of input data, and produces its own, respective output from that input data.

Thus, each data processing operation in an embodiment comprises an execution thread processing a set of one or more input (e.g. initial or intermediate) data values to produce a set of one or more output (e.g. intermediate or overall output) data values. In an embodiment, each data processing operation comprises an execution thread reading a set of one or more input data values from storage (e.g. memory), processing the set of one or more input data values to generate a set of one or more output data values, and then writing the set of one or more output data values to storage (e.g. memory). In an embodiment, the number of output data values is less than the number of input data values. For example, each data processing (e.g. combining) operation in an embodiment comprises an execution thread processing (e.g. combining) two input data values to produce a single (e.g. combined) output data value. An output data value from one iteration in an embodiment becomes an input data value for the next iteration.

In the case of an additive reduction operation, each data processing operations will in an embodiment be to determine the sum of (in an embodiment two) data values. Correspondingly, for a multiplicative reduction operation, each data processing operations will in an embodiment be to multiply (in an embodiment two) data values. In the case of a maximum operation, each data processing operations will in an embodiment be to determine the maximum of (in an embodiment two) data values. Correspondingly, for a minimum operation, each data processing operations will in an embodiment be to determine the minimum of (in an embodiment two) data values. For binary operations, such as bitwise operations, such as AND, OR or XOR, each data processing operations will in an embodiment be to (bitwise) combine (in an embodiment two) data values accordingly.

An overall output result generated by performing the iterative data processing operation may be used as desired. For example, a result may be output, e.g. to external memory, and/or may be provided for, and used by, further instructions in the program being executed. Other arrangements would, of course, be possible. In all cases, an overall output result of the iterative data processing operation may be used by the data processing system to generate an output. The output that is generated can be any suitable and desired output, such as a render output or other information, such as metadata, for a set of data values, such as a data array.

As discussed above, in the technology described herein, an iterative data processing operation (such as a reduction operation) is performed such that at least one execution thread exits the iterative data processing operation (e.g. retires) when there is at least one iteration of the iterative data processing operation remaining in respect of which the execution thread will not perform a respective data processing operation. In other words, at least one execution thread of the set of plural execution threads exits the iterative data processing operation (e.g. retires) before at least the last iteration of the iterative data processing operations begins.

In an embodiment, each execution thread of the set of plural execution threads performing the iterative data processing operation, where possible and appropriate, exits the iterative data processing operation (e.g. retires) "early" in this manner. Thus, in an embodiment, all of the execution threads of the set of plural execution threads, except those which perform a respective data processing operation in respect of the last iteration of the iterative data processing operation, exit the iterative data processing operation (e.g. retire) before the last iteration of the iterative data processing operations begins. The arrangement is in an embodiment such that different execution threads of the set of plural execution threads exit the iterative data processing operation (e.g. retire) after participating in different numbers of iterations of the iterative data processing operation.

In an embodiment, as mentioned above, an (and in an embodiment each) execution thread exits the iterative data processing operation (e.g. retires) before performing any processing that (the e.g. compiler has determined) will not affect an output of the iterative data processing operation and/or program. Thus, in an embodiment, an (and in an embodiment each) execution thread exits the iterative data processing operation (e.g. retires) before any iterations of the iterative data processing operation begin in respect of which the execution thread will not perform a respective data processing operation.

Thus, the arrangement is in an embodiment such that an (and in an embodiment each) execution thread exits the iterative data processing operation (e.g. retires) after participating in the first iteration of the iterative data processing operation and any (zero or more) subsequent iterations in respect of which the execution thread performs a respective data processing operation, and without (before) participating in any iterations of the iterative data processing operation in respect of which the execution thread will not perform a respective data processing operation. Correspondingly, and as mentioned above, where iterations are synchronised by means of a barrier instruction, an (and in an embodiment each) execution thread exits the iterative data processing operation (e.g. retires) before executing any "omittable" barrier instructions.

Thus, in the case where each subsequent iteration of the iterative data processing operation comprises fewer execution threads of the set of plural execution threads performing a respective data processing operation than the (immediately) previous iteration, each (i.e. the first and each subsequent) iteration of the iterative data processing operation (optionally other than the last iteration) in an embodiment comprises at least one execution thread of the set of plural execution threads exiting the iterative data processing operation (e.g. retiring) (and optionally one or more other execution threads of the set of plural execution threads joining a barrier). However, it will be appreciated that there may be iterations of the iterative data processing operation in which no execution threads exit the iterative data processing operation (e.g. retire).

Thus, execution threads of the set of plural execution threads in an embodiment perform the iterative data processing operation such that an (and in an embodiment each) execution thread of the set of plural execution threads that is performing the iterative data processing operation exits the iterative data processing operation (e.g. retires) before any (zero or more) iterations of the iterative data processing operation begin in respect of which the execution thread will not perform a respective data processing operation.

It will be appreciated that execution threads that perform a respective data processing operation in respect of the last iteration of the iterative data processing operation should, and in an embodiment do, exit the iterative data processing operation (and retire) after the last iteration of the iterative data processing operation has been completed.

Thus, of the set of plural execution threads that perform the iterative data processing operation, at least one execution thread should perform a respective data processing operation in respect of each iteration of the iterative data processing operation and then exit the iterative data processing operation (and retire) after all iterations of the iterative data processing operation have been completed, and at least one other execution thread should perform a respective data processing operation in respect of at least the first iteration of the iterative data processing operation and then exit the iterative data processing operation (e.g. retire) before all iterations of the iterative data processing operation have begun. This latter, at least one other execution thread may be, for example, at least one execution thread that only performs a respective data processing operation in respect of the first iteration of the iterative data processing operation and then exits the iterative data processing operation (e.g. retires), and/or at least one execution thread that only performs a respective data processing operation in respect of the first and some but not all of the subsequent iterations of the iterative data processing operation and then exits the iterative data processing operation (e.g. retires), and/or at least one execution thread that performs a respective data processing operation in respect of all but the last iteration of the iterative data processing operation.

The Applicants have appreciated that the effect of an execution thread exiting the iterative data processing operation will be that that execution thread can then go on to perform other useful processing. Similarly, the effect of an execution thread retiring will be that another execution thread can then be issued to, and processed by, the execution lane that was executing the retired execution thread.

Thus, in an embodiment, as already mentioned, when an execution thread of the set of plural execution threads that is performing the iterative data processing operation exits the iterative data processing operation ("early"), the execution thread then performs other processing when there is at least one iteration of the iterative data processing operation remaining. In this case, the other processing is in an embodiment processing which can be performed out of synchronisation with other execution threads of the set of plural execution threads.

In an embodiment, once an execution thread has retired, another execution thread is issued for execution to the execution lane that was processing the retired execution thread. The arrangement is in an embodiment such that at the same time as (in parallel with) at least the last iteration of the iterative data processing operation, there is at least one execution lane that processed an execution thread that retired from the iterative data processing operation that is processing another execution thread for another data processing operation.

Thus, in an embodiment, when an execution thread of the set of plural execution threads that is performing the iterative data processing operation retires, a new execution thread is issued to the execution lane that was processing the retired execution thread for performing another data processing operation when there is at least one iteration of the iterative data processing operation remaining.

In this case, the another data processing operation that is performed in parallel with the iterative data processing operation in this manner can be any suitable and desired processing operation, such as and in an embodiment, another instance of the iterative data processing operation, e.g. and in an embodiment, for another set of plural processing items (workgroup).

Indeed, an advantage of the technology described herein is that execution threads can exit the iterative data processing operation (e.g. retire) earlier than would otherwise be the case, such that execution threads and execution lanes can become available earlier than would otherwise be the case, such that other processing can begin earlier than would otherwise be the case. This can then enable greater efficiency and a greater degree of parallelism.

It will be appreciated that in the technology described herein, execution threads may operate to process data values that were generated by other execution threads in a previous iteration. To account for this, iterations of the iterative data processing operation are in an embodiment synchronised to ensure that all data values to be generated in one iteration have been generated before the next iteration can begin, so that the correct data values are then available to be processed in the next iteration.

Thus, each subsequent iteration of the iterative data processing operation should not, and in an embodiment does not, begin until the previous iteration has been completed. Threads may be synchronised with each other to operate in this manner in any suitable and desired manner.

In an embodiment, each subsequent iteration of the iterative data processing operation can only begin once a condition has been satisfied, with the condition in an embodiment being such that it can only be satisfied once all participating (e.g. active (not retired)) execution threads of a (the) set of plural execution threads (i.e. all execution threads of the set of plural execution threads other than those that have exited the iterative data processing operation (e.g. retired)) (for a (the) set of plural processing items (workgroup)) have completed the previous iteration. Thus, each subsequent iteration of the iterative data processing operation is in an embodiment performed (begins) in response to a condition being satisfied.

This can be implemented as desired. In an embodiment, as already mentioned, the arrangement is such that an (each) iteration of the iterative data processing operation involves execution threads joining a "barrier", with execution threads that have joined the barrier only being released from the barrier once all participating (e.g. active) execution threads of the set of plural execution threads (for a set of plural processing items (workgroup)) have joined the barrier. The released execution threads may then begin the next iteration of the iterative data processing operation, and may then join a barrier in respect of that next iteration, and so on. In this case, an execution thread may join a barrier in response to executing a "barrier" instruction in the (set of one or more instructions in the) program.

Thus, in an embodiment, the condition for beginning a subsequent iteration of the iterative data processing operation is satisfied when all participating (e.g. active) execution threads of the set of plural execution threads have joined a barrier (in respect of the previous iteration of the iterative data processing operation). In an embodiment, the arrangement is such that an (each) iteration of the iterative data processing operation involves an (each participating, e.g. active) execution thread performing a respective data processing operation and then either exiting the iterative data processing operation (e.g. retiring) or joining a barrier.

In an embodiment, to account for execution threads exiting the iterative data processing operation (e.g. retiring) "early" in the manner of the technology described herein, the (e.g. barrier) condition that must be satisfied before the next iteration can begin changes from one iteration of the iterative data processing operation to the next. In an embodiment, the condition is changed when an execution thread exits (e.g. retires) "early" from the iterative data processing operation in the manner of the technology described herein, and in an embodiment in response to an execution thread exiting (e.g. retiring) "early".

For example and in an embodiment, the condition is such that it can only be satisfied when a certain number of execution threads of the set of plural execution threads have joined a barrier, and the number of execution threads required to join a barrier to satisfy the condition is in an embodiment changed when (and in an embodiment in response to) an execution thread of the set of plural execution threads exits the iterative data processing operation (e.g. retires) (when there is at least one iteration of the iterative data processing operation remaining). This then allows the barrier operation to take account of execution threads exiting (e.g. retiring) "early".

It is believed that the idea of a (e.g. barrier) condition being changed in response to an execution thread exiting (e.g. retiring) "early" from an iterative data processing operation may be novel and inventive in its own right.

Thus, an embodiment of the technology described herein comprises a method of operating a data processor that is operable to execute programs to perform data processing operations, and in which a program can be executed by plural execution threads at the same time; the method comprising:
when a set of plural execution threads is executing a program to perform an iterative data processing operation that comprises a first iteration and one or more subsequent iterations, wherein each subsequent iteration of the iterative data processing operation is performed in response to a condition being satisfied, and wherein execution threads of the set of plural execution threads may exit the iterative data processing operation when there is at least one iteration of the iterative data processing operation remaining:
changing the condition when an execution thread of the set of plural execution threads that is performing the iterative data processing operation exits the iterative data processing operation when there is at least one iteration of the iterative data processing operation remaining.

An embodiment of the technology described herein comprises a data processor comprising:
a programmable execution unit operable to execute programs to perform data processing operations, and in which a program can be executed by plural execution threads at the same time; and
a processing circuit configured to, when a set of plural execution threads is executing a program to perform an iterative data processing operation that comprises a first iteration and one or more subsequent iterations, wherein each subsequent iteration of the iterative data processing operation is performed in response to a condition being satisfied, and wherein execution threads of the set of plural execution threads may exit the iterative data processing operation when there is at least one iteration of the iterative data processing operation remaining:
change the condition when an execution thread of the set of plural execution threads that is performing the iterative data processing operation exits the iterative data processing operation when there is at least one iteration of the iterative data processing operation remaining.

As will be appreciated by those skilled in the art, these embodiments of the technology described herein can and in an embodiment do include one or more, and in an embodiment all, of the features of the technology described herein, as appropriate. For example, the condition for performing a subsequent iteration is in an embodiment satisfied when all participating (e.g. active) execution threads have joined a barrier (as discussed above). In an embodiment, the condition is changed when an execution thread retires, and in an embodiment in response to an execution thread retiring.

The method in an embodiment comprises (and the data processor is correspondingly configured):
performing an iteration of the iterative data processing operation;
determining whether the condition is satisfied; and
when it is determined that the condition is satisfied:
performing a next iteration of the iterative data processing operation;
an execution thread of the set of plural execution threads exiting the iterative data processing operation, and optionally retiring;
changing the condition (in response to the execution thread exiting the iterative data processing operation or retiring); and
determining whether the changed condition is satisfied; and
when it is determined that the changed condition is satisfied:
performing a further iteration of the iterative data processing operation.

The (e.g. barrier) condition could be changed when (in response to) an (each) individual execution thread exits the iterative data processing operation (e.g. retires). However, in an embodiment, where threads are grouped into thread groups, the (e.g. barrier) condition is changed when (in response to) the last thread of a (each) thread group exits the iterative data processing operation (e.g. retires), i.e. such that all threads of a thread group must exit (e.g. retire) before the (e.g. barrier) condition is changed.

The (e.g. barrier) condition may be changed when a thread (group) exits the iterative data processing operation (e.g. retires) ("early") in any suitable and desired manner.

There could be a specific "change condition" instruction that is visible to the application program interface (API) for the program for causing the (e.g. barrier) condition to change. Thus, the (e.g. barrier) condition could change in response to (an instructions (or instructions) included in the program in response to) an instruction that is visible to the application program interface (API) for the program. In an embodiment, the data processor is configured to monitor for execution threads retiring, and to change the (e.g. barrier) condition in response to an execution thread retiring. Thus, in an embodiment, the condition is changed in response to an execution thread retiring.

These embodiments can be achieved in any suitable and desired manner.

In an embodiment, the data processor maintains a count representative of the number of execution threads of a (the) set of plural execution threads (for a set of plural processing items (workgroup)) that have completed a particular iteration of the iterative data processing operation and joined a "barrier" in respect of that iteration, i.e. a "barrier count". The barrier count may count, e.g., individual execution threads or thread groups. The barrier count is in an embodiment set (e.g. to zero) at the start of an (each) iteration, and is in an embodiment updated (e.g. increased, e.g. by one) in response to a thread (group) of the set of execution threads (for the set of plural processing items (workgroup)) completing the iteration in question and joining the barrier in question.

The data processor in an embodiment also maintains a count representative of the number of participating (e.g. active) execution threads of the set of plural execution threads (for the set of plural processing items (workgroup)), i.e. a "participating thread count" representative of the number of execution threads of the set of plural execution threads (for the set of plural processing items (workgroup)) that have not yet exited the iterative data processing operation (or retired). The participating thread count may count, e.g., individual execution threads or thread groups. The participating thread count is in an embodiment set (e.g. to the number of threads or thread groups in the set of plural execution threads) at the start of the (first iteration of the) iterative data processing operation.

In this case, the condition for beginning the next iteration (i.e. releasing the barrier) is in an embodiment satisfied when the participating thread count and barrier count indicate that all participating (e.g. active) threads of the set of plural execution threads (for the set of plural processing items (workgroup)) have completed the iteration of the iterative data processing operation in question and joined the barrier in question, e.g. when the participating thread count is equal to the barrier count.

In this case, the (e.g. barrier) condition is in an embodiment changed by appropriately updating the participating thread count. For example the participating thread count could be updated in response to a "change condition" instruction. In an embodiment, the participating thread count is updated in response to a thread (group) retiring ("early"). For example, the participating thread count may be decreased (e.g. by one), e.g. in response to a thread or thread group retiring ("early").

In this way, a barrier may not wait for e.g. retired execution threads, such that it can be released even though execution threads have e.g. retired "early".

Thus, in an embodiment, an iteration of the iterative data processing operation involves a (participating, e.g. active) execution thread performing a respective data processing operation and then either exiting the iterative data processing operation (or retiring) and (potentially) updating the participating thread count, or joining a barrier and (potentially) updating the barrier count (for that iteration).

Where there are plural sets of plural processing items (workgroups) (sets of plural execution threads), the data processor in an embodiment maintains a respective barrier count and participating thread count in this manner for each set of plural processing items (workgroup) (set of plural execution threads).

It may be determined whether a (e.g. barrier) condition has been satisfied at any suitable point while performing the iterative data processing operation. In an embodiment, it is determined whether a (e.g. barrier) condition is satisfied in response to a barrier count being updated, and in an embodiment also in response to an participating thread count being updated.

Thus, in an embodiment, it is determined whether a (the) (e.g. barrier) condition is satisfied in response to a thread (group) of the set of plural execution threads (set of plural processing items (workgroup)) completing an iteration of the iterative data processing operation and joining the barrier in question. In an embodiment, it is (in an embodiment also) determined whether a (the) (e.g. barrier) condition is satisfied in response to a thread (group) of the set of plural execution threads (set of plural processing items (workgroup)) retiring ("early") (without joining the barrier in question) or in response to a "change condition" instruction. The next iteration of the iterative data processing operation is then in an embodiment performed (begins) when it is determined that the (e.g. barrier) condition is satisfied.

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The technology described herein is applicable to any suitable form or configuration of data processor and data processing system, such as graphics processors (and systems) having a "pipelined" arrangement (in which case the graphics processor comprises a rendering pipeline). It may be applicable, for example, to tile-based graphics processors and graphics processing systems. Thus the data processor may be a tile-based graphics processor.

In an embodiment, the various functions of the technology described herein are carried out on a single data processing platform that generates and outputs data, for example for a display device.

As will be appreciated by those skilled in the art, the data processor of the technology described herein may be part of an overall data (e.g. graphics) processing system that includes, e.g., and in an embodiment, a host processor that, e.g., executes applications that require processing by the data (e.g. graphics) processor. The host processor will send appropriate commands and data to the data (e.g. graphics) processor to control it to perform data (e.g. graphics) processing operations and to produce data (e.g. graphics) processing output required by applications executing on the host processor. To facilitate this, the host processor should, and in an embodiment does, also execute a driver for the data processor and optionally a compiler or compilers for compiling (e.g. shader) programs to be executed by (e.g. a programmable execution unit of) the data processor.

The data processor may also comprise, and/or be in communication with, one or more memories and/or memory devices that store the data described herein, and/or the output data generated by the data processor, and/or store software (e.g. (shader) program) for performing the processes described herein. The data processor may also be in communication with a host microprocessor, and/or with a display for displaying images based on the data generated by the data processor.

The technology described herein can be used for all forms of output that a data (e.g. graphics) processor may be used to generate. For example, the data (e.g. graphics) processor may execute a graphics processing pipeline that generates frames for display, render-to-texture outputs, etc. The output data values from the processing are in an embodiment exported to external, e.g. main, memory, for storage and use, such as to a frame buffer for a display.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the components of the data processing system can otherwise include any one or more or all of the usual functional units, etc., that such components include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc. . . . . .

The technology described herein also extends to a computer software carrier comprising such software which when used to operate a data processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

A number of embodiments of the technology described herein will now be described. These embodiments will be described with specific reference to the use of the technology described herein in a graphics processor and for graphics shader programs, but as discussed above, the technology described herein is equally applicable to other forms of data processor, and programs.

FIG. 1 shows a typical graphics processing system. An application 2 executing on a host processor 1 will require processing operations to be performed by an associated graphics processing unit (GPU) (graphics processor) 3. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1.

FIG. 2 shows a graphics processing pipeline 33 that may be executed by the graphics processor 3.

The graphics processing pipeline 33 shown in FIG. 2 is a tile-based renderer and will thus produce tiles of a render output data array, such as an output frame to be generated.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output data array may typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processing pipeline 33 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuit(s) and/or processing logic, etc., for performing the necessary operation and functions.

As shown in FIG. 2, the graphics processing pipeline 33 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 33. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 33.

The rasterisation stage 25 of the graphics processing pipeline 33 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. The tile buffer stores colour and depth buffers that store an appropriate colour, etc., or Z-value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). The display device could comprise, e.g., a display comprising an array of pixels, such as a computer monitor or a printer.

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 33 would be possible.

The above describes certain features of the operation of a graphics processing system shown in FIG. 1. Further features of the operation of the graphics processing system shown in FIG. 1 in accordance with embodiments of the technology described herein will now be described.

As can be seen from FIG. 2, the graphics processing pipeline 33 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler to binary code for the target graphics processing pipeline 33. This may include the creation of one or more intermediate representations of the program within the compiler. The compiler may, e.g., be part of the driver 4, with there being a special API call to cause the compiler to run. The compiler execution can thus be seen as being part of the draw call preparation done by the driver in response to API calls generated by an application. (Other compiler arrangements would, of course, be possible.)

FIG. 3 illustrates this, and shows the shader program being provided in the high level shader programming language 301 by the application 2 to the driver 4, which then compiles 302 the shader program to the binary code 303 for the graphics processing pipeline 33.

As discussed above, each shader in the graphics processing pipeline is a processing stage that performs graphics processing by running small programs for each "work item" in an output to be generated (an "item" in this regard is usually a vertex, or a sampling position). For each work item to be processed, an execution thread that will execute the corresponding shader program is issued to an appropriate shader core (programmable execution unit) that then executes the shader program for the execution thread in question.

To allow for plural execution threads being executed at the same time (in parallel), the shader core(s) will typically be arranged as plural execution lanes, with each execution lane being able to perform processing operations for one execution thread.

It is also known to use the shader functionality of graphics processors and graphics processing pipelines for performing more general computing tasks, for example in accordance with compute shader API's such as OpenCL and Vulkan. In this case, the execution lanes of the shader core(s) of the graphics processor 3 will be used to perform more general data processing tasks, that may not specifically relate to the generation of graphics data for a graphics output (e.g. for display).

The present embodiments relate in particular to efficient mechanisms for performing operations such as so-called "reduction" operations. Such "reduction" operations may be required when performing graphics processing or compute shading. One example is a "tiled reduction" operation, which may be used, for example, by graphics processes such as tiled lighting or clustered lighting, to e.g. find the minimum and/or maximum depth value in a lighting tile. Another example of a "reduction" operation that may be required when performing compute shading is the workgroup reduction operation described in OpenCL (work_group_reduce).

In OpenCL an application can submit kernels to a graphics processor to perform a processing operation for a 3-dimensional iteration space called an NDRange (with each iteration (element) in the space being a work item). Each NDRange is partitioned into workgroups, and each workgroup comprises one or more subgroups. Each subgroup may be, e.g., mapped to a thread group (warp) that will be executed by the graphics processor (such that each thread corresponds to a respective work item of the subgroup).

A reduction operation may be performed for respective workgroups, for example, to sum (add) all of the data values for a workgroup (an additive reduction operation), or it may, for example, be to determine the product of (multiply) all of the data values for a workgroup. It could also be to determine the maximum or minimum of all of the data values for a workgroup.

Figure 4:
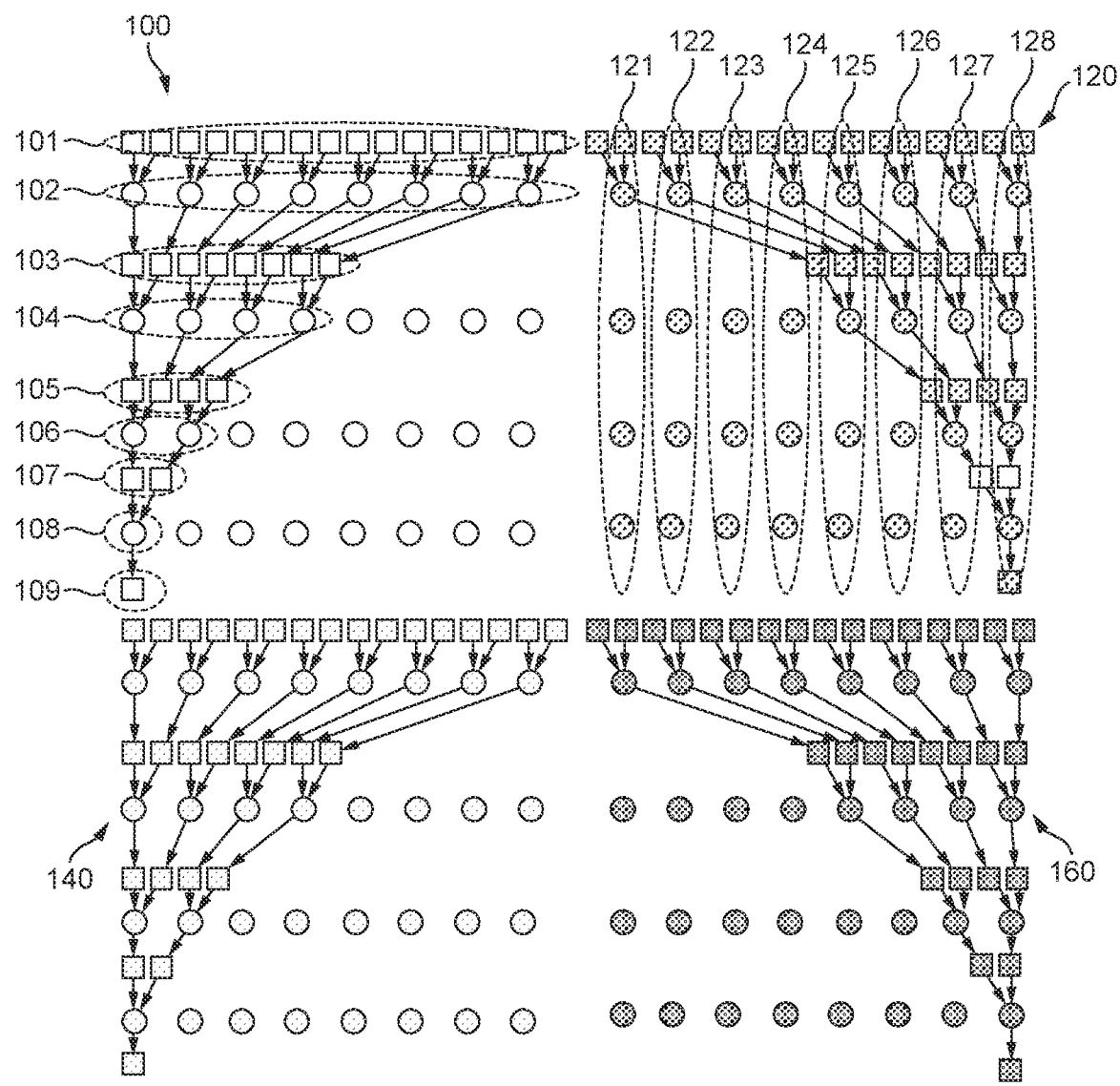
FIG. 4 illustrates an example of a four reduction operations.

FIG. 4 illustrates one way to perform such reduction operations. FIG. 4 illustrates four reduction operations being performed for four respective workgroups 100, 120, 140, 160 by a graphics processor 3 that is arranged with sixteen execution lanes, such that it can execute sixteen threads in parallel. In the illustrated example, each reduction operation operates to combine sixteen initial "input" data values for a respective workgroup into a single "output" data value for the workgroup.

In the example illustrated in FIG. 4, each reduction operation is performed by a respective set of eight threads issued to a respective set of eight execution lanes of the graphics processor 3. Each such set of eight execution threads operates to perform a reduction operation in an iterative manner, with each iteration (cycle) of the reduction operation involving one or more threads of the set of eight execution threads each combining two respective data values in the manner required (e.g. adding, multiplying, or determining the maximum or minimum of, the two data values) to generate a single combined data value (e.g. the sum, product, maximum or minimum of the two data values).

In the example illustrated in FIG. 4, the first iteration of a reduction operation involves all eight execution threads of the respective set of execution threads each performing a respective combining operation. Each subsequent iteration then involves only half of the threads that performed a combining operation in the previous iteration performing a respective combining operation. Each reduction operation thus involves the sixteen initial input data values for the respective workgroup being combined into a single output data value over a total of four iterations.

For example, in the case of workgroup 100, the first iteration of the reduction operation involves all eight execution threads 102 combining respective pairs of the sixteen initial input data values 101 for the workgroup 100 into eight respective intermediate combined data values 103, the second iteration of the reduction operation involves four of the execution threads 104 combining respective pairs of the eight intermediate combined data values 103 into four respective intermediate combined data values 105, the third iteration of the reduction operation involves two of the execution threads 106 combining respective pairs of the four intermediate combined data values 105 into two respective intermediate combined data values 107, and the fourth iteration of the reduction operation involves one of the execution threads 108 combining the two intermediate combined data values 107 into the single output data value 109 for the workgroup 100.

It will be appreciated that in this example, execution threads will operate to combine data values that were generated by other execution threads in a previous iteration. To account for this, a barrier operation is used to ensure that all data values to be generated in one iteration have been generated before the next iteration can begin, so that the correct data values are then available to be combined in the next iteration.

In this example, the barrier operation is such that all eight threads of a set of eight threads performing a reduction operation must arrive at (join) the barrier before the next iteration of the reduction operation can begin. Thus, in this example, all eight threads of a set of eight threads perform each iteration of a reduction operation in synchronisation with each other. All eight threads are then retired after all of the iterations have been completed. A new set of eight threads may then be issued to the same set of execution lanes to perform another reduction operation for another workgroup.

For example, in the case of workgroup 120, as illustrated in FIG. 4, all eight threads 121-128 of the respective set of eight threads perform each iteration of the reduction operation in synchronisation with each other. All eight threads 121-128 are then retired after all of the iterations of the reduction operation have been completed. In the example illustrated in FIG. 4, a new set of eight threads is then issued to the same set of execution lanes to perform another reduction operation for workgroup 160.

Since the graphics processor 3 of the present example can execute sixteen threads in parallel, it can perform two reduction operations in this manner at the same time (in parallel). Thus, in the example illustrated in FIG. 4, the reduction operations for the first two workgroups 100, 120 are performed at the same time, and then the reduction operations for the other two workgroups 140, 160 begin after the reduction operations for the first two workgroups 100, 120 have been completed. Accordingly, it will be appreciated that a total of eight iterations (cycles) are required in order to complete all four reduction operations of this example.

As discussed above, the Applicants have recognised that performing a reduction operation in this manner results in some execution threads not performing a respective combining operation in some iterations (cycles) of the reduction operation, but only participating in the barrier operation for those iterations (cycles). Moreover, the number of such execution threads that do not perform a respective combining operation will increase from one iteration (cycle) of a reduction operation to the next.

For example, in the case of workgroup 120, as illustrated in FIG. 4, four execution threads 121-124 will not perform a respective combining operation during the second iteration of the reduction operation for that workgroup 120, six execution threads 121-126 will not perform a respective combining operation during the third iteration of the reduction operation, and seven execution threads 121-127 will not perform a respective combining operation during the fourth iteration of the reduction operation.

Figure 5:
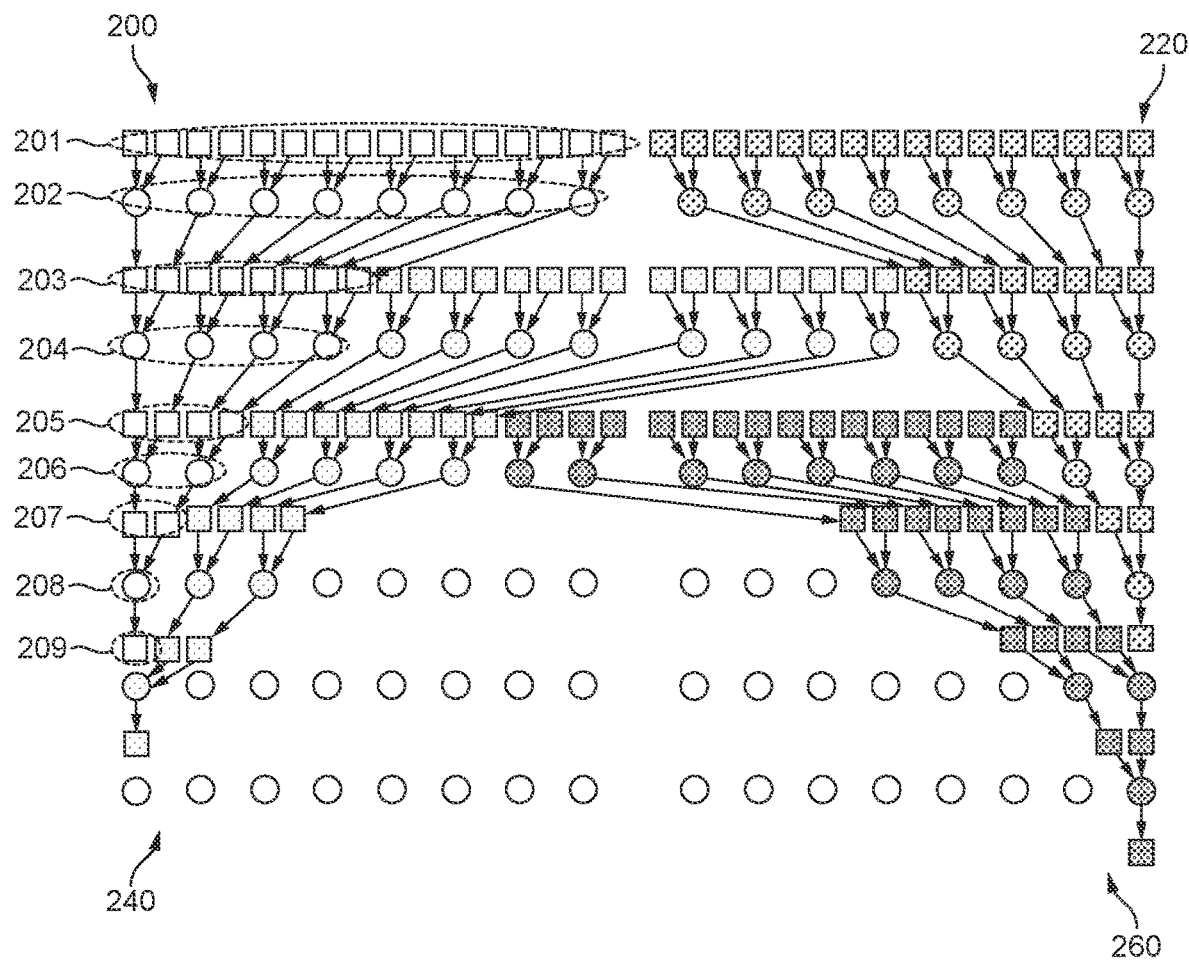
FIG. 5 illustrates four reduction operations being performed according to an embodiment of the technology described herein.

FIG. 5 illustrates a more efficient method of performing a reduction operation according to an embodiment of the technology described herein. FIG. 5, like FIG. 4, illustrates four reduction operations being performed for four respective workgroups 200, 220, 240, 260 by a graphics processor 3 that is arranged with sixteen execution lanes, such that it can execute sixteen threads at the same time (in parallel). Each reduction operation again operates to combine sixteen initial "input" data values for a respective workgroup into a single "output" data value for the workgroup. However, it will be appreciated that other numbers of workgroups, threads, and input data values, etc. would be possible.

In the present embodiment, like in the example of FIG. 4, each reduction operation is performed by a respective set of eight threads issued to a respective set of eight execution lanes of the graphics processor 3. Each set of eight execution threads operates to perform a reduction operation in an iterative manner. However, it will again be appreciated that other numbers of threads in a set of threads performing a reduction operation would be possible.

In the present embodiment, like in the example of FIG. 4, each iteration (cycle) of a reduction operation involves one or more execution threads of the respective set of eight execution threads each combining two respective data values in the manner required (e.g. adding, multiplying, or determining the maximum or minimum of, the two data values) to generate a single combined data value (e.g. the sum, product, maximum or minimum of the two data values).

As illustrated in FIG. 5, like in the example of FIG. 4, the first iteration of a reduction operation of the present embodiment involves all eight execution threads of the respective set of execution threads each performing a respective combining operation. Each subsequent iteration then involves only half of the threads that performed a combining operation in the previous iteration performing a respective combining operation. Each reduction operation thus involves the sixteen initial input data values for the respective workgroup being combined into a single output data value over a total of four iterations (cycles).

However, rather than retiring execution threads of a set of execution threads performing a reduction operation only once all iterations of the reduction operation have been completed (as is done in the example of FIG. 4), in the embodiment of FIG. 5 each execution thread of a set of execution thread performing a reduction operation retires once it has completed (in response to it completing) all of the iterations of the reduction operation in which the execution thread actually performs a combining operation, i.e. such that the execution thread does not participate in any iterations of the reduction operation in which it would otherwise not perform a respective combining operation. Thus, in the present embodiment, some execution threads of a set of execution threads performing a reduction operation retire "early" from the reduction operation, i.e. such that different execution threads of the set of execution threads retire from the reduction operation after participating in different numbers of iterations of the reduction operation.

For example, in the case of workgroup 200, as illustrated in FIG. 5, the first iteration of the reduction operation involves all eight execution threads 202 combining respective pairs of the sixteen initial input data values 201 for the workgroup 200 into eight respective intermediate combined data values 203. Four of the execution threads then retire, and the second iteration of the reduction operation then only involves the four remaining execution threads 204 combining respective pairs of the eight intermediate combined data values 203 into four respective intermediate combined data values 205. A further two of the remaining execution threads then retire, and the third iteration of the reduction operation then only involves the two remaining execution threads 206 combining respective pairs of the four intermediate combined data values 205 into two respective intermediate combined data values 207. A further one of the remaining execution threads then retires, and the fourth iteration of the reduction operation then only involves the last remaining execution thread 208 combining the two intermediate combined data values 207 into the single output data value 209 for the workgroup 200.

Thus, in embodiments of the technology described herein, execution threads not performing a respective combining operation in some iterations of a reduction operation, but only participating in barrier operations for those iterations, are avoided. Accordingly, it will be appreciated that embodiments of the technology described herein can allow reduction operations to be performed in a more efficient manner, such that the energy consumption of a graphics processor 3 performing a reduction operation can be reduced, for example.

Moreover, it will be appreciated that retiring an execution thread "early" in this manner will result in execution lanes becoming available earlier than would otherwise be the case, such that new execution threads can then be issued to the available execution lanes and begin their execution earlier than would otherwise be the case. This can enable a greater degree of parallelism.

For example, in the embodiment of FIG. 5, the first iteration of the reduction operation for workgroup 200 is performed in parallel with the first iteration of the reduction operation for workgroup 220. Four of the execution threads that participated in the first iteration of the reduction operation for workgroup 220 and four of the execution threads that participated in the first iteration of the reduction operation for workgroup 200 then retire, such that eight execution lanes subsequently become available.

A set of eight threads for performing the reduction operation for workgroup 240 is then issued to the eight available execution lanes. The first iteration of the reduction operation for workgroup 240 is then performed in parallel with the second iteration of the reduction operation for workgroup 220 and the second iteration of the reduction operation for workgroup 200. Four of the execution threads that participated in the first iteration of the reduction operation for workgroup 240, two of the execution threads that participated in the second iteration of the reduction operation for workgroup 220 and two of the execution threads that participated in the second iteration of the reduction operation for workgroup 200 then retire, such that eight execution lanes subsequently become available.

A set of eight threads for performing the reduction operation for workgroup 260 is then issued to the eight available execution lanes. The first iteration of the reduction operation for workgroup 260 is then performed in parallel with the second iteration of the reduction operation for workgroup 240, the third iteration of the reduction operation for workgroup 220 and the third iteration of the reduction operation for workgroup 200. Four of the execution threads that participated in the first iteration of the reduction operation for workgroup 260, two of the execution threads that participated in the second iteration of the reduction operation for workgroup 240, one of the execution threads that participated in the third iteration of the reduction operation for workgroup 220, and one of the execution threads that participated in the third iteration of the reduction operation for workgroup 200 then retire, such that eight execution lanes subsequently become available. The eight available execution lanes may then be used for another reduction operation (not shown), or for other purposes, and so on.

It will be appreciate that in the embodiment of FIG. 5 a total of six iterations (cycles) are required in order to complete all four reduction operations. Thus, as compared to the example of FIG. 4 which requires a total of eight iterations (cycles) to complete all four reduction operations, the embodiment of FIG. 5 allows reduction operations to be performed in a faster, and more efficient manner.

Moreover, it will be appreciated that retiring threads "early" in the manner of the embodiment of FIG. 5 will allow a greater number of workgroups to be active at the same time, e.g. in a system in which the total number of active execution threads is limited.

In the embodiment of FIG. 5, like in the example of FIG. 4, execution threads performing a reduction operation are synchronised to ensure that all data values to be generated in one iteration of the reduction operation have been generated before the next iteration of the reduction operation can begin, so that the correct data values are available to be combined in the next iteration.

However, to allow for "early" retiring threads (i.e. threads retiring before the last one or more iterations of a reduction operation have begun), rather than synchronising threads by means of a barrier which requires that all eight threads of a respective set of eight threads must arrive at the barrier before the next iteration can begin (like in the example of FIG. 4), the embodiment of FIG. 5 uses a "partial barrier" operation for which the requirement (condition) for threads to be released from the barrier to begin a next iteration changes from one iteration to the next iteration of a reduction operation.

In particular, the "partial barrier" operation of the embodiment of FIG. 5 is such that the number of threads that must arrive at the barrier before the barrier is released corresponds to the number of threads that remain to perform the reduction operation, i.e. the number of threads that have not already retired from performing the reduction operation. Thus, this "partial barrier" operation, in contrast with conventional barrier operation, allows a barrier to be released in response to some but not all of the execution threads for a workgroup joining the barrier.

Figure 6:
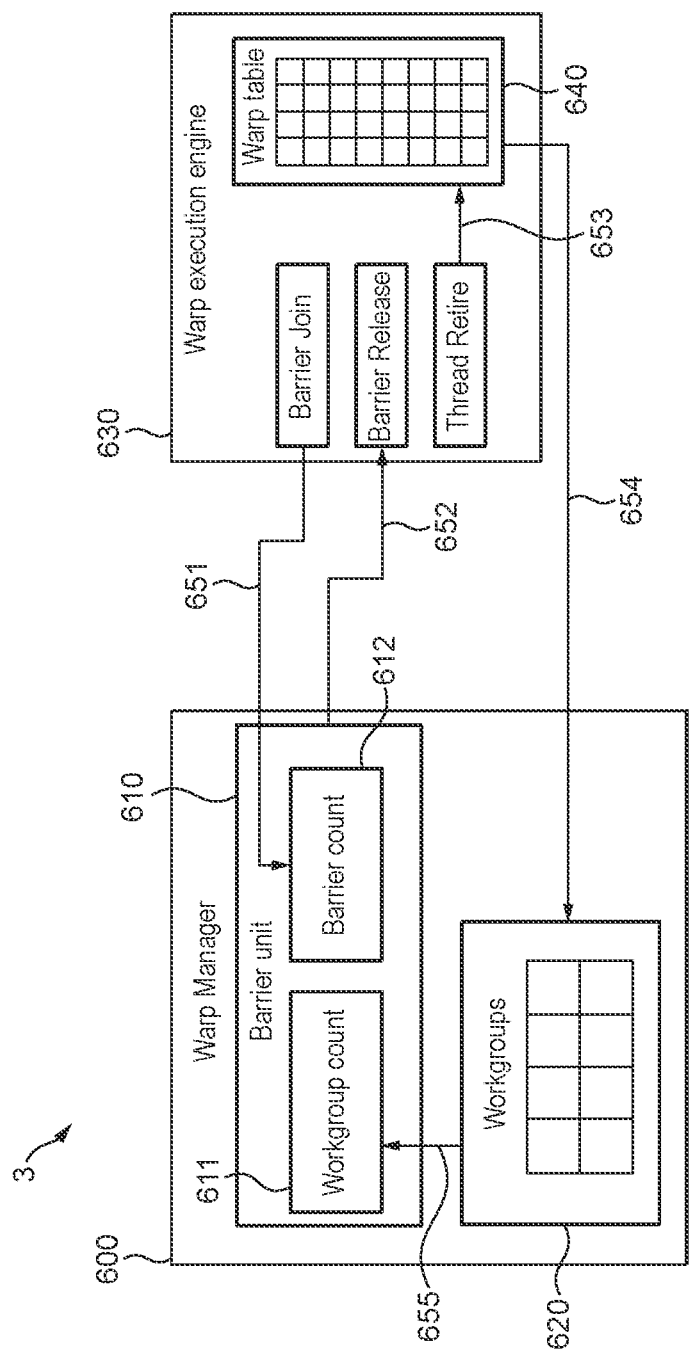
FIG. 6 shows schematically a graphics processor that can operate in accordance with an embodiment of the technology described herein.

The number of threads of this "partial barrier" release condition could change with the granularity of a single thread, however, FIGS. 6 and 7 illustrate an embodiment in which the "partial barrier" release condition changes with the granularity of a thread group ("warp").

FIG. 6 shows the graphics processor 3 in accordance with these embodiments. FIG. 6 shows the main elements of the graphics processor 3 that are relevant to the operation of the present embodiment. As will be appreciated by those skilled in the art there may be other elements of the graphics processor 3 that are not illustrated in FIG. 6. It should also be noted here that FIG. 6 is only schematic, and that, for example, in practice the shown functional units may share significant hardware circuits, even though they are shown schematically as separate elements in FIG. 6. It will also be appreciated that each of the elements and units, etc., of the graphics processor 3 as shown in FIG. 6 may be implemented as desired and will accordingly comprise, e.g., appropriate circuit(s) and/or processing logic, etc., for performing the necessary operation and functions.

As shown in FIG. 6, the graphics processor 3 of the present embodiment includes a warp manager 600 and a warp execution engine 630. The warp manager 600 operates to issue (schedule) thread groups ("warps") of execution threads to the warp execution engine 630 for execution. Each thread group ("warp") may comprise a total of eight, sixteen or thirty-two execution threads, for example. Other groupings of threads would be possible.

The warp execution engine 630 then executes a shader program for each execution thread of a thread group ("warp") issued to it, to generate appropriate output data for each execution thread. In the present embodiment, the shader program is provided by the application 2, and may be complied for execution by the driver 4.

To allow for parallel thread execution, the warp execution engine 630 is arranged as a plurality of execution lanes. In the present embodiment, the warp execution engine 630 is configured with the same number of execution lanes as there are threads in a thread group ("warp"). However, other numbers of execution lanes would be possible.

The threads in one thread group ("warp") of execution threads each execute the shader program in lockstep, one instruction at a time. Grouping execution thread into groups in this manner can improve the execution efficiency of the execution engine 630, because it is possible to share instruction fetch and scheduling resources between all the threads in the group.

As illustrated in FIG. 6, the warp manager 600 maintains a workgroup table 620. The workgroup table 620 includes an entry for each workgroup to be processed. Each entry in the workgroup table 620 initially indicates the number of subgroups within the corresponding workgroup, and thus the number of corresponding thread groups ("warps") that the warp manager 600 will issue (schedule) to the warp execution engine 630 for processing that workgroup.

As illustrated in FIG. 6, the warp execution engine 630 maintains a warp table 640, which is initiated when the warp manager 600 issues a thread group ("warp") to it for execution. The warp table 640 includes an entry for each thread of the thread group ("warp") that the warp execution engine 630 is currently executing. Each entry in the warp table 640 initially indicates that the corresponding execution thread is active, and then when a thread retires, the corresponding entry in the warp table 640 is updated to indicate that that thread is no longer active.

As illustrated in FIG. 6, to facilitate barrier operation, the warp manager 600 further includes a barrier unit 610. The barrier unit 610 maintains a workgroup count 611 and a barrier count 612. The barrier count 612 counts the number of thread groups ("warps") (subgroups) for a workgroup that have joined a barrier, and the workgroup count 611 ("participating thread count") indicates the number of thread groups ("warps") (subgroups) for that workgroup that should have joined the barrier before the barrier can be released. The workgroup count 611 is initially equal to the total number of subgroups within a workgroup, and the barrier count for that workgroup is initially zero.

Figure 7A:
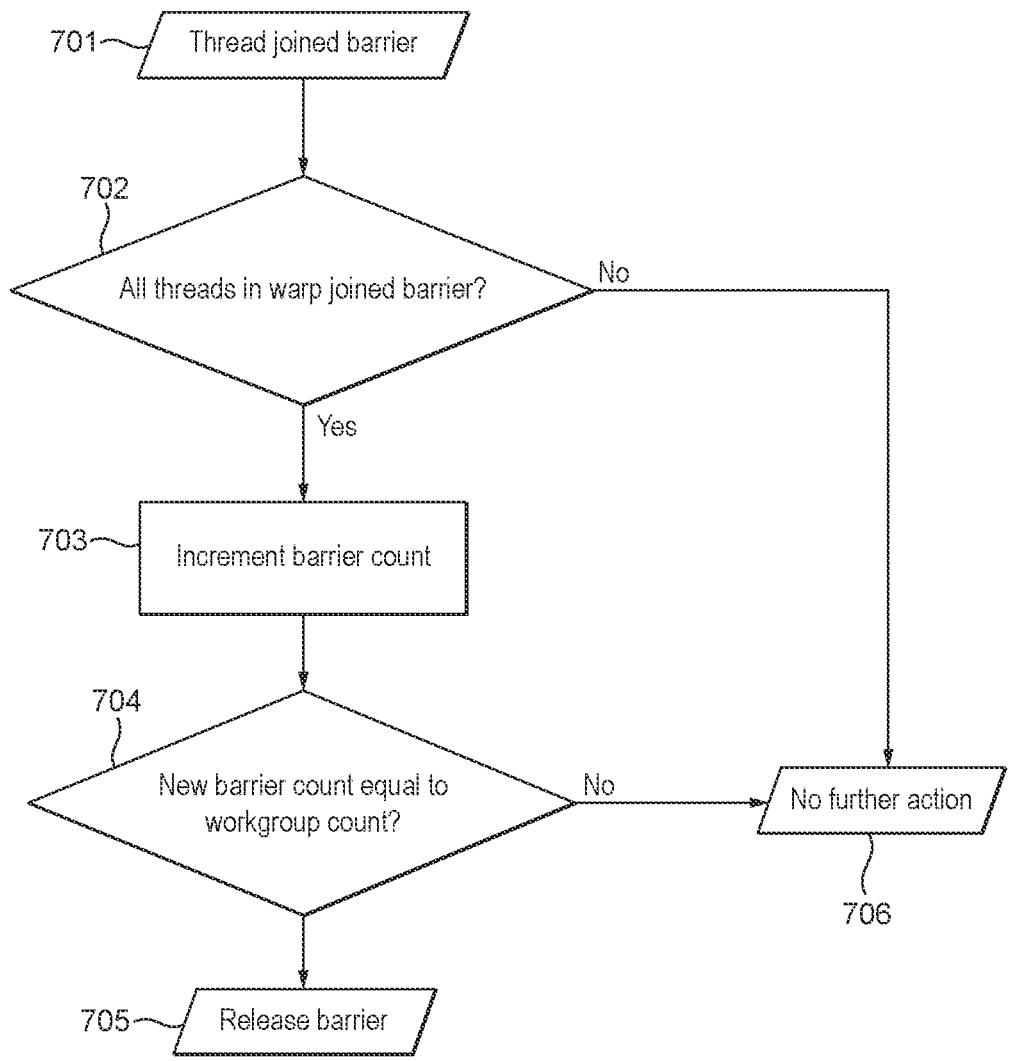
FIG. 7A and FIG. 7B show methods of operating the graphics processor of FIG. 6 in accordance with embodiments of the technology described herein.

FIG. 7A illustrates the operation of the graphics processor 3 of FIG. 6 when a thread joins a barrier. As shown in FIG. 7A, when a thread of a thread group ("warp") that the warp execution engine 630 is executing joins a barrier 701, it is determined 702 whether or not all of the threads of that thread group ("warp") have joined the barrier. If other than all of the threads of that thread group ("warp") have joined the barrier, no further action in respect of the barrier operation is taken 706. Otherwise, if all of the threads of that thread group ("warp") have joined the barrier, as illustrated in FIG. 6, the warp execution engine 630 signals 651 this to the barrier unit 610. In response to the signal 651, the barrier unit 610 increments 703 the barrier count 612 for the workgroup that the thread group ("warp") is being processed for by one.

As illustrated in FIG. 7A, the barrier unit 610 then compares 704 the incremented barrier count 612 to the workgroup count 611 to determine whether the condition for releasing the barrier has been satisfied. If the workgroup count 611 and barrier count 612 are not equal, this indicates that not all of the thread groups ("warps") (subgroups) for the workgroup that should have joined the barrier before the barrier can be released have joined the barrier. Thus, in this case, no further action in respect of the barrier operation is taken 706.

If, however, the workgroup count 611 and barrier count 612 are equal, this indicates that all of the thread groups ("warps") (subgroups) for the workgroup that should have joined the barrier before the barrier can be released have joined the barrier. Thus, in this case, the barrier unit 610 causes the barrier to be released 705 by, as illustrated in FIG. 6, issuing a barrier release signal 652 to the warp execution engine 630.

Figure 7B:
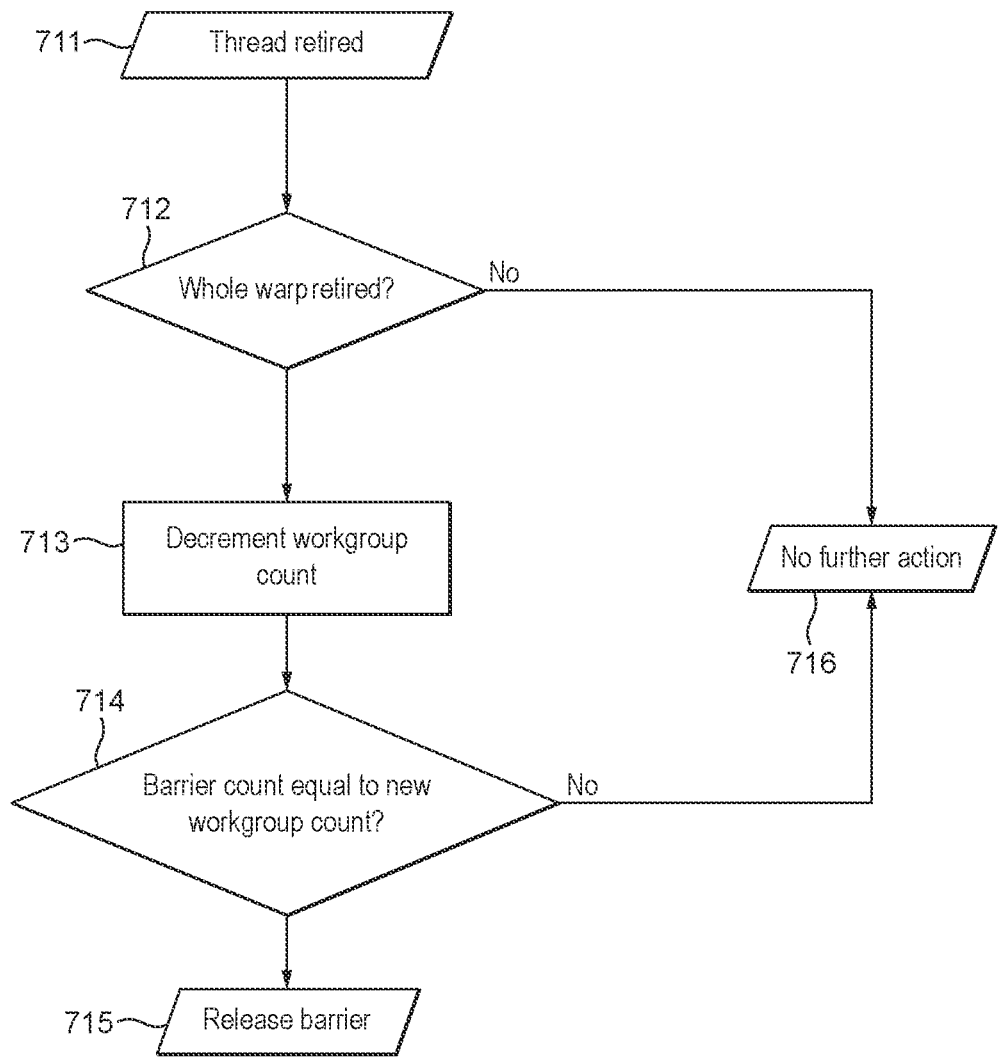

FIG. 7B illustrates the operation of the graphics processor 3 of FIG. 6 when a thread retires. When a thread of a thread group ("warp") that the warp execution engine 630 is executing retires 711, the corresponding entry in the warp table 640 is updated 653 to indicate that the thread is no longer active, and it is then determined 712 whether or not all of the threads of that thread group ("warp") have retired, by determining whether or not the warp table 640 indicates that all threads of that thread group ("warp") are no longer active. If other than all of the threads of that thread group ("warp") have retired, no further action in respect of the barrier operation is taken 716. Otherwise, if all of the threads of that thread group ("warp") have retired, as illustrated in FIG. 6, the warp execution engine 630 signals 654 this to the warp manager 600.

In response to the signal 654, the warp manager 600 decrements the entry in the workgroup table 620 for the workgroup that the thread group ("warp") was being processed for by one, to indicate that one fewer subgroup (thread group ("warp")) remains to be processed for that workgroup. This then triggers 655 the workgroup count 611 for the workgroup that the thread group ("warp") was being processed for to be decremented 713 by one.

As illustrated in FIG. 7B, the barrier unit 610 then compares 714 the decremented workgroup count 611 to the barrier count 612 to determine whether the condition for releasing the barrier has been satisfied. If the workgroup count 611 and barrier count 612 are not equal, this indicates that not all of the thread groups ("warps") (subgroups) for the workgroup that should have joined the barrier before the barrier can be released have joined the barrier. Thus, in this case, no further action in respect of the barrier operation is taken 716.

If, however, the workgroup count 611 and barrier count 612 are equal, this indicates that all of the thread groups ("warps") (subgroups) for the workgroup that should have joined the barrier before the barrier can be released have joined the barrier. Thus, in this case, the barrier unit 610 causes the barrier to be released 715 by, as illustrated in FIG. 6, issuing a barrier release signal 652 to the warp execution engine 630.

Thus, in the present embodiment, the barrier unit 610 determines whether to release a barrier for a workgroup based on a comparison between the number of thread groups ("warps") (subgroups) for the workgroup that have joined the barrier and the number of thread groups ("warps") (subgroups) for the workgroup that have not yet retired. Thus, in contrast with arrangements which determine whether to release a barrier based on a comparison between the number of thread groups ("warps") that have joined the barrier and the total number of thread groups ("warps") for a workgroup, the condition for releasing the barrier of the present embodiment changes as thread groups ("warps") retire. This then facilitates efficiently performing a reduction operation in the manner described above with reference to FIG. 5.

Figure 8:
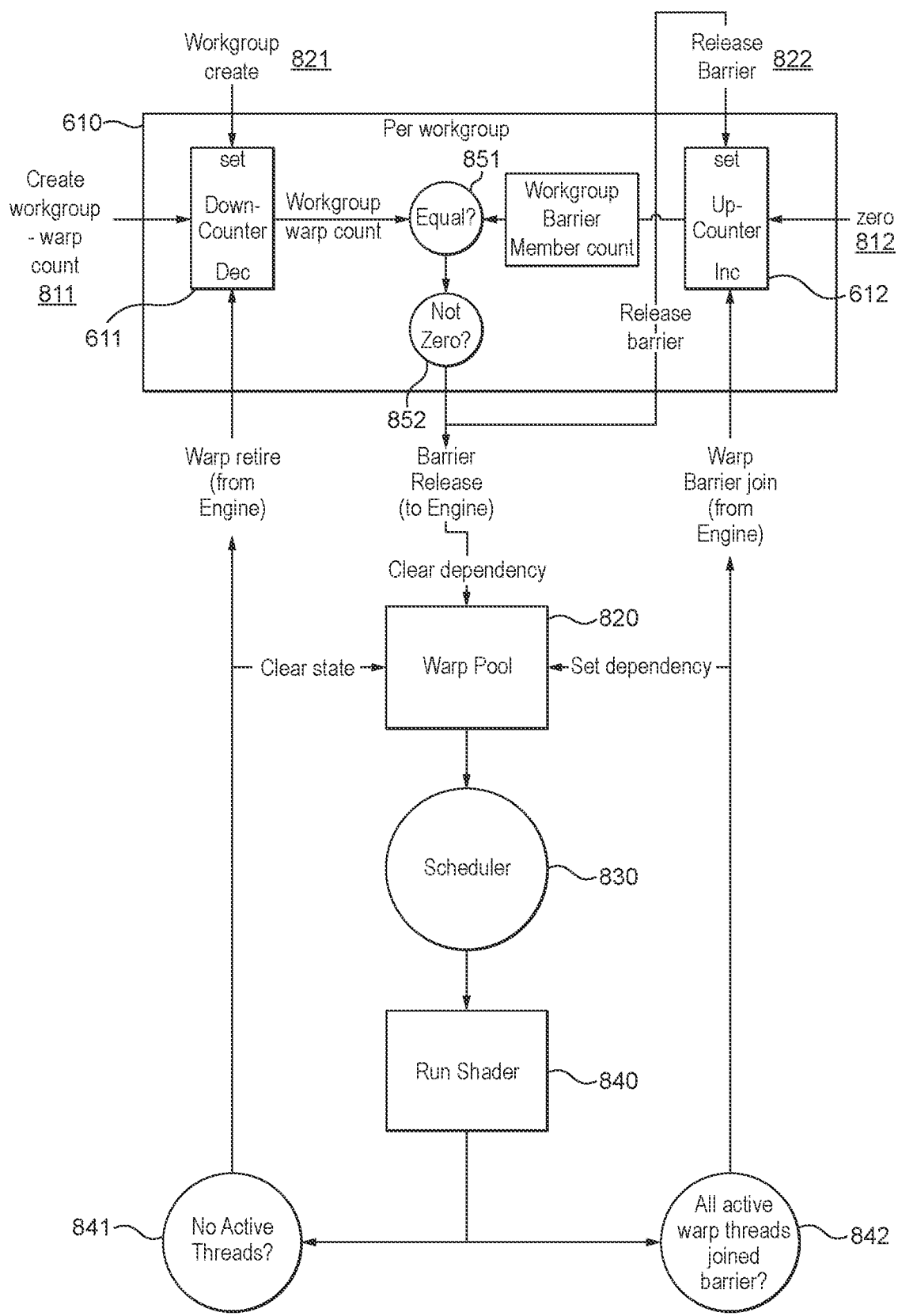
FIG. 8 shows a methods of operating a graphics processor in accordance with an embodiment of the technology described herein.

FIG. 8 illustrates this "partial barrier" operation of the present embodiments in more detail.

As illustrated in FIG. 8, the barrier unit 610 maintains a workgroup count 611 ("active thread count") and a barrier count 612 for each workgroup being processed. The workgroup count 611 for a workgroup is initially set to the number 811 of thread groups ("warps") (subgroups) for the workgroup in response to the workgroup being created 821, and the corresponding barrier count 612 is initially set to zero 812.

The execution engine 630 schedules 820, 830 the threads of a thread group ("warp") to execute 840 a shader program, and in response to instructions in the shader program, the threads may generate an event 841 that indicates that all of the threads of the thread group ("warp") have retired, or an event 842 that indicates that all of the threads of the thread group ("warp") have joined a barrier. These events 841, 842 are passed to the barrier unit 610.

In response to receiving an event 841 that indicates that all of the threads of a thread group ("warp") have retired, the barrier unit 610 decrements the workgroup count 611 for the workgroup in question. In response to receiving an event 842 that indicates that all of the threads of a thread group ("warp") have joined a barrier, the barrier unit 610 increments the barrier count 612 for the barrier for the workgroup in question.

In response to decrementing the workgroup count 611 or incrementing the barrier count 612 for a workgroup, the barrier unit 610 determines whether the workgroup count 611 and the barrier count 612 for the workgroup are now equal 851. If the workgroup count 611 and the barrier count 612 are equal, then a check 852 is made to determine whether the workgroup count 611 and the barrier count 612 are equal to zero. If the workgroup count 611 and the barrier count 612 are equal to zero, then this indicates that all thread groups ("warps") for a workgroup have retired, and that there are no thread groups ("warps") for the workgroup waiting to be released from a barrier.

Otherwise, if the workgroup count 611 and the barrier count 612 are not equal to zero (and are equal to each other), this indicates that there are thread groups ("warps") for the workgroup waiting to be released from a barrier, and that the condition for releasing the barrier has been satisfied. The barrier unit 610 therefore signals to the execution engine 630 that the barrier can be released, and sets 822 the barrier count 612 for the workgroup back to zero 812. The execution engine then schedules 820, 830 a thread group ("warp") for execution 840, e.g. so as to continue execution of the shader program beyond the barrier in question, and so on.

The following pseudo-code illustrates example high level shader program code 301 for performing an additive reduction operation.

```
#define THREAD_COUNT 1024
groupshared float shared_mem[2*THREAD_COUNT];
layout(local_size_x  =  THREAD_COUNT,  local_size_y  =  1,
local_size_z = 1) in;
/* Define reduction operator */
float reduce_operation(float a, float b)
{
  return a + b;
}
void main( )
{
/* Populate the shared memory with the data to reduce */
  shared_mem[gl_LocalInvocationID.x] = read_something(0); //
  Read a float from a location in global memory, offset by 0
  shared_mem[gl_LocalInvocationID.x + THREAD_COUNT] =
  read_something(THREAD_COUNT); // Read a float from a
  location in global memory, offset by THREAD_COUNT
/* Start with all threads */
  unsigned n_threads_active = THREAD_COUNT;
/* Iterate */
  while(n_threads_active != 0)
  {
    if(gl_LocalInvocationID.x < n_threads_active)
    {
    shared_mem[gl_LocalInvocationID.x]                =
    reduce_operation(shared_mem[gl_LocalInvocationID.x],
    shared_mem[gl_LocalInvocationID.x + n_threads_active]);
    }
    barrier( );
    n_threads_active /= 2;
  }
  if(gl_LocalInvocationID.x == 0)
  }
  /* Write the final reduced output to global memory */
  write_output(shared_mem[0]);
  }
}
```

In this example, an execution thread will call the function reduce_operation to perform a respective addition operation for an iteration of the loop if the condition gl_LocalInvocationID.x<n_threads_active is satisfied, where gl_LocalInvocationID.x is a per-thread identifier, and n_threads_active is initially set equal to the total number of execution threads, and is reduced by half at each iteration. Thus, in this example, the number of execution threads that perform a respective addition operation reduces by a half from each iteration to the next. To ensure thread synchronisation, the function barrier( ) is called at each iteration to trigger barrier join events, as discussed above.

In an embodiment, it may be recognised e.g. by a compiler compiling the program, that because n_threads_active will monotonically decrease on every iteration of the loop and gl_LocalInvocationID.x is a per-thread constant, when if(gl_LocalInvocationID.x<n_threads_active) becomes false it will remain false until the end of the loop. It may furthermore be recognised (by the compiler) that all memory writes outside of the loop are only performed when the condition if(gl_LocalInvocationID.x==0) is satisfied.

It may therefore be determined (by the compiler) that threads can be safely retired if both if(gl_LocalInvocationID.x<n_threads_active) and if(gl_LocalInvocationID.x==0) are false. An overall condition for "early retirement" of threads can thus be determined by ANDing together the inverse of these two conditions. Thus, in the present embodiment, an execution thread can safely retire early if if(!(gl_LocalInvocationID.x<n_threads_active) && !(gl_LocalInvocationID.x==0)) is true.

In the present embodiment, a conditional branch is therefore included in the program to cause execution threads to retire early when they satisfy this "early retirement" condition. The following pseudo-code illustrates this.

```
#define THREAD_COUNT 1024
groupshared float shared_mem[2*THREAD_COUNT];
layout(local_size_x = THREAD_COUNT, local_size_y = 1,
local_size_z = 1) in;
/* Define reduction operator */
float reduce_operation(float a, float b)
{
  return a + b;
}
void main( )
{
/* Populate the shared memory with the data to reduce */
  shared_mem[gl_LocalInvocationID.x] = read_something(0);
  // Read a float from a location in global memory, offset by 0
  shared_mem[gl_LocalInvocationID.x + THREAD_COUNT] =
  read_something(THREAD_COUNT); // Read a float from a
  location in global memory, offset by THREAD_COUNT
/* Start with all threads active */
  unsigned n_threads_active = THREAD_COUNT;
/* Iterate */
  while(n_threads_active != 0)
  {
    if(gl_LocalInvocationID.x < n_threads_active)
    {
      shared_mem[gl_LocalInvocationID.x] =
      reduce_operation(shared_mem[gl_LocalInvocationID.x],
      shared_mem[gl_LocalInvocationID.x + n_threads_active]);
    }
/* Retire threads that satisfy the determined condition for safely
retiring threads */
    if(!(gl_LocalInvocationID.x < n_threads_active) &&
    !(gl_LocalInvocationID.x == 0))
    {
      goto end;
    }
    barrier( ); // barrier operation
    n_threads_active /= 2;
  }
  if(gl_LocalInvocationID.x == 0)
  {
    /* Write the final reduced output to global memory */
    write_output(shared_mem[0]);
  }
end:
}
```

In this case, a thread will jump to the end of the program and retire early if it satisfies the determined early retirement condition. To account for the possibility of threads retiring early, the operation of the graphics processor 3 in response to barrier( ) is adjusted accordingly, as discussed above.

Although the above has been described with particular reference to an execution thread retiring early, in other embodiments an execution thread may exit the iterative data processing operation early such that it remains active and then continues with other processing.

Although the above has been described with particular reference to performing a "reduction" operation, other suitable operations, such as pre-fix sums, may also be performed in the manner of the technology described herein.

It will be appreciated from the above that the technology described herein, in its embodiments at least, provides arrangements in which the processing required to perform iterative operations, such as reduction operations and pre-fix sums, can be reduced. This is achieved, in the embodiments of the technology described herein at least, by retiring execution threads that are no longer required to complete the iterative operation from the iterative operation before all iterations of the iterative operation have begun. In embodiments of the technology described herein, this is facilitated by changing a barrier condition in response to execution threads retiring from the iterative operation.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a data processing system that comprises a data processor that is operable to execute programs to perform data processing operations, and in which a program can be executed by plural execution threads at the same time; the method comprising:
  including in a program to be executed by the data processor, a set of one or more instructions which when executed by execution threads of a set of plural execution threads will cause execution threads of the set of plural execution threads to operate together to perform an iterative data processing operation that comprises plural iterations including a first iteration and then one or more subsequent iterations, and in which:
    each iteration of the plural iterations of the iterative data processing operation will comprise one or more execution threads of the set of plural execution threads each performing a respective data processing operation;
    the first iteration of the iterative data processing operation will comprise all execution threads of the set of plural execution threads each performing a respective data processing operation;
    each of the one or more subsequent iterations of the iterative data processing operation will comprise a subset of one or more of the execution threads that performed a respective data processing operation in the previous iteration each performing a respective data processing operation, and one or more other execution threads of the execution threads that performed a respective data processing operation in the previous iteration not performing a respective data processing operation; and
    each of one or more iterations of the plural iterations of the iterative data processing operation will comprise at least one execution thread of the set of plural execution threads exiting the iterative data processing operation when there is at least one iteration of the plural iterations of the iterative data processing operation remaining in respect of which the execution thread will not perform a respective data processing operation whereby the at least one execution thread will not participate in all of the plural iterations of the iterative data processing operation;
  whereby the execution threads of the set of plural execution threads will be caused to operate together to perform the iterative data processing operation wherein at least one execution thread of the set of plural execution threads that is performing the iterative data processing operation will:
    perform a respective data processing operation in respect of the first iteration of the iterative data processing operation;
    perform a respective data processing operation in respect of each of zero or more of the one or more subsequent iterations of the iterative data processing operation; and then exit the iterative data processing operation when there is at least one iteration of the plural iterations of the iterative data processing operation remaining in respect of which the execution thread will not perform a respective data processing operation whereby the at least one execution thread will not participate in all of the plural iterations of the iterative data processing operation;

the method further comprising, when a set of plural execution threads is executing the program, in response to the set of instructions:

execution threads of the set of plural execution threads operating together to perform the iterative data processing operation; and at least one execution thread of the set of plural execution threads that is performing the iterative data processing operation:

performing a respective data processing operation in respect of the first iteration of the iterative data processing operation;

performing a respective data processing operation in respect of each of zero or more of the one or more subsequent iterations of the iterative data processing operation; and then exiting the iterative data processing operation when there is at least one iteration of the plural iterations of the iterative data processing operation remaining in respect of which the execution thread will not perform a respective data processing operation whereby the at least one execution thread will not participate in all of the plural iterations of the iterative data processing operation.

2. The method of claim 1, wherein including the set of one or more instructions in the program comprises including one or more instructions in the program to trigger an execution thread to exit the iterative data processing operation in response to an instruction that is visible to an application program interface for the program.

3. The method of claim 1, wherein including the set of one or more instructions in the program comprises automatically including one or more instructions in the program to trigger an execution thread to exit the iterative data processing operation.

4. The method of claim 1, wherein each subsequent iteration of the iterative data processing operation comprises a fraction of the execution threads that performed a respective data processing operation in the previous iteration performing a respective data processing operation.

5. The method of claim 1, wherein the iterative data processing operation is a reduction operation or a pre-fix sum operation.

6. The method of claim 1, wherein the at least one execution thread exiting the iterative data processing operation comprises the at least one execution thread retiring, wherein the data processor is configured as a plurality of execution lanes, and wherein each execution lane is operable to process execution threads; the method comprising:

when an execution thread of the set of plural execution threads that is performing the iterative data processing operation retires, issuing a new execution thread to the execution lane that was processing the retired execution thread for performing another data processing operation when there is at least one iteration of the iterative data processing operation remaining.

7. The method of claim 1, wherein each subsequent iteration of the iterative data processing operation is performed in response to a condition being satisfied; the method comprising:

changing the condition when the at least one execution thread exits the iterative data processing operation.

8. The method of claim 7, wherein the data processor is operable to maintain a count representative of the number of execution threads of the set of plural execution threads that have not yet exited the iterative data processing operation; and wherein changing the condition comprises updating the count.

9. A data processing system comprising:

a data processor that is operable to execute programs to perform data processing operations, and in which a program can be executed by plural execution threads at the same time; and a processing circuit configured to include in a program to be executed by the data processor, a set of one or more instructions which when executed by execution threads of a set of plural execution threads will cause execution threads of the set of plural execution threads to operate together to perform an iterative data processing operation that comprises plural iterations including a first iteration and then one or more subsequent iterations, and in which:

each iteration of the plural iterations of the iterative data processing operation will comprise one or more execution threads of the set of plural execution threads each performing a respective data processing operation;

the first iteration of the iterative data processing operation will comprise all execution threads of the set of plural execution threads each performing a respective data processing operation;

each of the one or more subsequent iterations of the iterative data processing operation will comprise a subset of one or more of the execution threads that performed a respective data processing operation in the previous iteration each performing a respective data processing operation, and one or more other execution threads of the execution threads that performed a respective data processing operation in the previous iteration not performing a respective data processing operation; and each of one or more iterations of the plural iterations of the iterative data processing operation will comprise at least one execution thread of the set of plural execution threads exiting the iterative data processing operation when there is at least one iteration of the plural iterations of the iterative data processing operation remaining in respect of which the execution thread will not perform a respective data processing operation whereby the at least one execution thread will not participate in all of the plural iterations of the iterative data processing operation;

whereby the execution threads of the set of plural execution threads will be caused to operate together to perform the iterative data processing operation wherein at least one execution thread of the set of plural execution threads that is performing the iterative data processing operation will:

perform a respective data processing operation in respect of the first iteration of the iterative data processing operation;

perform a respective data processing operation in respect of each of zero or more of the one or more subsequent iterations of the iterative data processing operation; and then exit the iterative data processing operation when there is at least one iteration of the plural iterations of the iterative data processing operation remaining in respect of which the execution thread will not perform a respective data processing operation whereby the at least one execution thread will not participate in all of the plural iterations of the iterative data processing operation;

wherein the data processor is configured wherein, when a set of plural execution threads is executing the program, in response to the set of instructions:

execution threads of the set of plural execution threads will operate together to perform the iterative data processing operation; and at least one execution thread of the set of plural execution threads that is performing the iterative data processing operation will:

perform a respective data processing operation in respect of the first iteration of the iterative data processing operation;

perform a respective data processing operation in respect of each of zero or more of the one or more subsequent iterations of the iterative data processing operation; and then exit the iterative data processing operation when there is at least one iteration of the plural iterations of the iterative data processing operation remaining in respect of which the execution thread will not perform a respective data processing operation whereby the at least one execution thread will not participate in all of the plural iterations of the iterative data processing operation.

10. The system of claim 9, wherein the processing circuit is configured to include one or more instructions in the program to trigger an execution thread to exit the iterative data processing operation in response to an instruction that is visible to an application program interface for the program.

11. The system of claim 9, wherein the processing circuit is configured to automatically include one or more instructions in the program to trigger an execution thread to exit the iterative data processing operation.

12. The system of claim 9, wherein each subsequent iteration of the iterative data processing operation comprises a fraction of the execution threads that performed a respective data processing operation in the previous iteration performing a respective data processing operation.

13. The system of claim 9, wherein the iterative data processing operation is a reduction operation or a pre-fix sum operation.

14. The system of claim 9, wherein the at least one execution thread exiting the iterative data processing operation comprises the at least one execution thread retiring, wherein the data processor is configured as a plurality of execution lanes, and each execution lane is operable to process execution threads; and wherein the data processor is configured wherein, when an execution thread of the set of plural execution threads that is performing the iterative data processing operation retires, a new execution thread can be issued to the execution lane that was processing the retired execution thread for performing another data processing operation when there is at least one iteration of the iterative data processing operation remaining.

15. The system of claim 9, wherein each subsequent iteration of the iterative data processing operation is performed in response to a condition being satisfied; and the data processor comprises a processing circuit configured to change the condition when an execution thread exits the iterative data processing operation when there is at least one iteration of the iterative data processing operation remaining.

16. The system of claim 15, wherein the data processor is operable to maintain a count representative of the number of execution threads of the set of plural execution threads that have not yet exited the iterative data processing operation; and wherein the processing circuit is configured to change the condition by updating the count.

17. A data processor comprising:

a programmable execution unit operable to execute programs to perform data processing operations, and in which a program can be executed by plural execution threads at the same time; and a processing circuit configured wherein, when a set of plural execution threads is executing a program that includes a set of one or more instructions for performing an iterative data processing operation that comprises plural iterations including a first iteration and then one or more subsequent iterations, and in which:

each iteration of the plural iterations of the iterative data processing operation will comprise one or more execution threads of the set of plural execution threads each performing a respective data processing operation;

the first iteration of the iterative data processing operation will comprise all execution threads of the set of plural execution threads each performing a respective data processing operation;

each of the one or more subsequent iterations of the iterative data processing operation will comprise a subset of one or more of the execution threads that performed a respective data processing operation in the previous iteration each performing a respective data processing operation, and one or more other execution threads of the execution threads that performed a respective data processing operation in the previous iteration not performing a respective data processing operation; and each of one or more iterations of the plural iterations of the iterative data processing operation will comprise at least one execution thread of the set of plural execution threads exiting the iterative data processing operation when there is at least one iteration of the plural iterations of the iterative data processing operation remaining in respect of which the execution thread will not perform a respective data processing operation whereby the at least one execution thread will not participate in all of the plural iterations of the iterative data processing operation; in response to the set of instructions:

execution threads of the set of plural execution threads will operate together to perform the iterative data processing operation; and at least one execution thread of the set of plural execution threads that is performing the iterative data processing operation will:

perform a respective data processing operation in respect of the first iteration of the iterative data processing operation;

perform a respective data processing operation in respect of each of zero or more of the one or more subsequent iterations of the iterative data processing operation; and then exit the iterative data processing operation when there is at least one iteration of the plural iterations of the iterative data processing operation remaining in respect of which the execution thread will not perform a respective data processing operation whereby the at least one execution thread will not participate in all of the plural iterations of the iterative data processing operation.

18. A non-transitory computer readable storage medium storing software code which when executing on a processor performs a method of compiling a program to be executed by a data processor, the method comprising:

including in the program, a set of one or more instructions which when executed by execution threads of a set of plural execution threads will cause execution threads of the set of plural execution threads to operate together to perform an iterative data processing operation that comprises plural iterations including a first iteration and then one or more subsequent iterations, and in which:

each iteration of the plural iterations of the iterative data processing operation will comprise one or more execution threads of the set of plural execution threads each performing a respective data processing operation;

the first iteration of the iterative data processing operation will comprise all execution threads of the set of plural execution threads each performing a respective data processing operation;

each of the one or more subsequent iterations of the iterative data processing operation will comprise a subset of one or more of the execution threads that performed a respective data processing operation in the previous iteration each performing a respective data processing operation, and one or more other execution threads of the execution threads that performed a respective data processing operation in the previous iteration not performing a respective data processing operation; and each of one or more iterations of the plural iterations of the iterative data processing operation will comprise at least one execution thread of the set of plural execution threads exiting the iterative data processing operation when there is at least one iteration of the plural iterations of the iterative data processing operation remaining in respect of which the execution thread will not perform a respective data processing operation whereby the at least one execution thread will not participate in all of the plural iterations of the iterative data processing operation;

whereby the execution threads of the set of plural execution threads will be caused to operate together to perform the iterative data processing operation wherein at least one execution thread of the set of plural execution threads that is performing the iterative data processing operation will:

perform a respective data processing operation in respect of the first iteration of the iterative data processing operation;

perform a respective data processing operation in respect of each of zero or more of the one or more subsequent iterations of the iterative data processing operation; and then exit the iterative data processing operation when there is at least one iteration of the plural iterations of the iterative data processing operation remaining in respect of which the execution thread will not perform a respective data processing operation whereby the at least one execution thread will not participate in all of the plural iterations of the iterative data processing operation.

* * * * *